(12) United States Patent
Doney

(10) Patent No.: US 12,229,286 B2
(45) Date of Patent: Feb. 18, 2025

(54) METHOD AND APPARATUS FOR CREATING AND MANAGING USER CONFIGURABLE OBJECTS AND FUNCTIONS ON DISTRIBUTED LEDGER NETWORKS

(71) Applicant: SECURRENCY, INC., Durham, NC (US)

(72) Inventor: George Daniel Doney, Riva, MD (US)

(73) Assignee: DTCC DIGITAL (US) INC., Jersey City, NJ (US)

( * ) Notice: Subject to any disclaimer, the term of this patent is extended or adjusted under 35 U.S.C. 154(b) by 580 days.

(21) Appl. No.: 17/677,605

(22) Filed: Feb. 22, 2022

(65) Prior Publication Data

US 2022/0188810 A1 Jun. 16, 2022
US 2023/0281601 A9 Sep. 7, 2023

Related U.S. Application Data

(63) Continuation-in-part of application No. 16/143,058, filed on Sep. 26, 2018, now Pat. No. 11,410,235, and
(Continued)

(51) Int. Cl.
| | |
|---|---|
| *G06F 21/00* | (2013.01) |
| *G06F 21/62* | (2013.01) |
| *G06F 21/64* | (2013.01) |
| *G06Q 20/36* | (2012.01) |
| *G06Q 20/40* | (2012.01) |
| *H04L 9/00* | (2022.01) |

(52) U.S. Cl.
CPC .......... *G06F 21/62* (2013.01); *G06F 21/6245* (2013.01); *G06F 21/64* (2013.01); *G06Q 20/367* (2013.01); *G06Q 20/401* (2013.01); *H04L 9/50* (2022.05); *G06Q 2220/00* (2013.01)

(58) Field of Classification Search
None
See application file for complete search history.

(56) References Cited

U.S. PATENT DOCUMENTS

| | | | |
|---|---|---|---|
| 2014/0129457 A1 | 5/2014 | Peeler | |
| 2018/0117446 A1* | 5/2018 | Tran | ........................ G06F 1/163 |

(Continued)

*Primary Examiner* — Andrew J Steinle
(74) *Attorney, Agent, or Firm* — NEO IP

(57) ABSTRACT

To achieve no code or low code parity in decentralized computing systems, disclosed implementations provide a data structure and trusted control plane that enables the creation and operation of composable objects, that is objects whose functions and properties are derived from configurable and upgradable templates. The templates are data structures that define the behavior of a collection of objects, the behaviors being the interfaces, functions, properties, events, triggers, error messages, and dependencies that define and object and its interaction with other objects and entities. Templates are configured by mapping the desired object behaviors to registered smart contract logic that affects the behaviors. Thus, complex objects can be composed without the need for new computer code. Additional logic to enable new behaviors can be added by authorized smart contract developers and, once certified, added to one or more templates to provide the objects access to the new capabilities.

36 Claims, 23 Drawing Sheets

Related U.S. Application Data a continuation-in-part of application No. 17/332,375, filed on May 27, 2021, now Pat. No. 11,876,915.

(60) Provisional application No. 63/151,834, filed on Feb. 22, 2021, provisional application No. 63/151,837, filed on Feb. 22, 2021, provisional application No. 62/563,684, filed on Sep. 27, 2017, provisional application No. 62/732,189, filed on Sep. 17, 2018, provisional application No. 63/030,416, filed on May 27, 2020.

(56) References Cited

U.S. PATENT DOCUMENTS

| | | |
|---|---|---|
| 2019/0080404 A1 | 3/2019 | Molinari et al. |
| 2020/0005284 A1* | 1/2020 | Vijayan ............... G06Q 20/065 |
| 2020/0089672 A1 | 3/2020 | Velisetti et al. |
| 2020/0349562 A1 | 11/2020 | Madhuram et al. |
| 2022/0006705 A1 | 1/2022 | Padmanabhan |
| 2022/0271915 A1 | 8/2022 | Turner et al. |

* cited by examiner

250

| ClassRegistry | | | ClassInterface | | | ClassDependency | |
|---|---|---|---|---|---|---|---|
| PK | UniqueID | | PK,FK1 | classId | | PK,FK1 | classId |
| FK | parentId | | PK,FK2 | logicId | | PK,FK2 | logicId |
| | name | | PK,FK2 | interfaceId | | PK,FK2 | dependencyId |
| | creator | | | name | | | name |
| | | | | | | FK | attributeId |
| | | | | | | FK | linkedId |
| | | | | | | | permissionType |
| | | | | | | | readOnly |

| ClassFunction | | | ClassProperty | | | ClassEvent | |
|---|---|---|---|---|---|---|---|
| PK,FK1 | classId | | PK,FK1 | classId | | PK,FK1 | classId |
| PK,FK2 | functionKey | | PK,FK2 | propertyKey | | PK,FK2 | eventKey |
| | interfaceId | | | interfaceId | | FK | interfaceId |
| | name | | | name | | | name |
| | permissionType | | FK | propertyId | | | |
| | permissionId | | | permissionType | | | |
| | | | | readOnly | | | |

| ClassTrigger | | | ClassSigner | | | ClassIdentifierType | |
|---|---|---|---|---|---|---|---|
| PK | UniqueID | | PK,FK1 | classId | | PK,FK1 | classId |
| FK | classId | | PK,FK2 | address | | PK,FK2 | typeId |
| | name | | | name | | | |
| | triggerType | | | | | | |
| | functionKey | | | | | | |
| | triggerData | | | | | | |

CREATE PROPERTY

NAME *
Rate<br/>

CONTEXT *
Securrency
Securrency

INHERIT FROM (optional)
select inherit from

SOURCE (optional)
select source

DATA TYPE *
Select data type

424

EXTERNAL ID (optional)
Type name

ADDRESS ON REFUSE (optional)
Enter Address

EXPIRATION TIME(DAYS) (optional)
Type the number of days

DESCRIPTION (optional)
Type description

KEYS (optional)

| | LogicRegistry |
|---|---|
| PK | UniqueID |
| | address |
| | name |
| | abi |
| | version |
| | price |

| | CertifierRegistry |
|---|---|
| PK | UniqueID |
| | address |
| | name |
| | price |
| | status |

| | LogicCertifier |
|---|---|
| PK,FK1 | logicId |
| PK,FK2 | certifierId |
| | status |

| | ExternalData |
|---|---|
| PK,FK1 | logicId |
| PK,FK2 | propertyId |
| | value |

FIG. 12

METHOD AND APPARATUS FOR CREATING AND MANAGING USER CONFIGURABLE OBJECTS AND FUNCTIONS ON DISTRIBUTED LEDGER NETWORKS

RELATED APPLICATION DATA

This application is a non-provisional application of provisional application Ser. Nos. 63/151,834 and 63/151,837, the entire disclosures of which is incorporated herein by reference. This application is a continuation-in part of U.S. application Ser. Nos. 16/143,058 and 17/332,375, the entire disclosures of which are incorporated herein by reference.

BACKGROUND

Distributed ledger technology (DLT) is a next generation computing platform that enables the creation of digital assets that can be issued and transacted without the necessary participation of intermediaries. At its core is a distributed ledger, which is a type of distributed database that operates without a central authority and replicates an identical copy to a non-hierarchical network of nodes that communicate with each other over peer-to-peer protocols. The ledger and resulting state of the system is secured from fault by the use of consensus mechanisms that replace the trusted node or central authority used in traditional distributed databases. The ability to decentralize state change authorization decisions is a principal DLT innovation. As DLT has evolved, the shared ledger can serve as the foundation for a decentralized computing platform that provides a runtime environment for programs stored on the ledger.

The first application of DLT was to create and run an application and digital currency named "Bitcoin," which was launched in 2009. Since then, Bitcoin inspired systems have been developed to create digital representations, represented by "tokens" of fungible (e.g., currency, gold, oil) and non-fungible assets (e.g., share certificates, crypto art) that are created and transacted upon DLT platforms. An attraction of this work is that the digital ("tokenized") assets can be exchanged simultaneously (e.g., asset for currency, also known as DvP, or currency for currency) using standardized logic (e.g., the ERC-20 fungible token standard or the ERC-721 non-fungible token standard) and without the need for reconciliation or a central authority.

As the range of tokenized assets has expanded and the reach of these instruments crosses regulatory boundaries, mechanisms to protect market participants while providing greater access have been demanded by regulatory authorities. Creating compliant digital assets in this landscape is difficult, as doing so requires coding for not only the properties of the asset, but also the functions and associated constraints needed to transact with the asset. For assets that are classified as securities, for example, these properties, functions, and constraints can be required by a multiplicity of regulations and laws in a multiplicity of jurisdictions across the globe. This means that each asset may require design, development, planning, and coding by one or more highly skilled persons with knowledge not only of how DLT works, but also the myriad of legal, regulatory and functional requirements and constraints. The process can be very expensive and consume substantial amounts of time.

The evolution of digital assets includes decentralized financial (DeFi) instruments. DeFi instruments are self-processing assets, that is, assets that implement their own financial behaviors as processing logic in smart contracts. These behaviors include complex financial functions including lending, market making, and yield farming. As these behaviors have become more complex and sophisticated, there is a need to combine object behaviors, substitute aspects of implementations for specific market requirements, reuse regulatory and compliance logic, and continue to adapt behaviors to a rapidly changing ecosystem.

The value created by the automation of financial processes has resulted in a global explosion of interest by talented individuals seeking to participate in financial transformation. Unlocking the next wave of innovation on blockchain networks can be accomplished by enabling "low code" development patterns on decentralized networks.

"Low code" development platforms are also well known. According to Wikipedia:

A low-code development platform (LCDP) provides a development environment used to create application software through a graphical user interface instead of traditional hand-coded computer programming. A low-code platform may produce entirely operational applications, or require additional coding for specific situations. Low-code development platforms reduce the amount of traditional hand coding, enabling accelerated delivery of business applications. A common benefit is that a wider range of people can contribute to the application's development—not only those with coding skills. LCDPs can also lower the initial cost of setup, training, deployment and maintenance.

Low code environments require object configurability, as well as predefined interfaces and schemas, and operate under centralized control models. With current technology, it is difficult, if not impossible, to adapt low code environments for use in decentralized platforms. This has made it difficult to develop sophisticated and interoperable applications on decentralized computing platforms because each new process or instrument requires new code development.

SUMMARY OF THE INVENTION

A framework is needed to accelerate development on decentralized networks by reusing existing proven logic and focusing only on the creation of new desired behaviors; enabling efficient, predictable interaction between objects; incentivizing the sharing innovative new behaviors through direct financial rewards for contributions that are used; and empowering innovators who do not write smart contract code to create new processes by connecting and combining existing logic.

The disclosed implementations provide for a computer-implemented system and method to reduce the amount of resource and time investment for creating tokenized assets, enabling their accelerated delivery and allowing a wide range of people, who may not have traditional technology engineering and software coding skills, to contribute to a system's development. This is accomplished through a system and method that describes and enables, in a decentralized computing environment, the configuration of digital asset templates from one or more pre-defined, extensible self-describing logic blocks that declare supported interfaces, properties, functions, events, dependencies, triggers, and requisite data in/outputs. The function and features of these configured templates can be extended by integration with future created logic blocks. Digital assets can be instantiated by creating a base object and assigning the object a template which infers it behaviors affected through the building blocks.

The disclosed implementations also provide for a pluggable computer-implemented framework for implementing pre-defined logic blocks. The logic blocks are both published to a DLT ledger and are implemented through a computer-implemented pluggable framework that provides a decentralized trusted control plane that links application code (in the form of smart contracts, for example) functions, events, and properties via editable and extensible class templates to create configurable object behavior. This framework records a list of defined interfaces published by authorized users creating consistent, reusable behaviors. It also performs orchestration and middleware tasks to route requests to internal and external logic while securing the interaction between objects and smart contracts, and also maintaining the security controls and accountability of the system, all within a decentralized network. In part, this framework functions both to prevent unauthorized execution and man in the middle attacks, that is, logic that routes an authorized request to an unauthorized execution location. This computer-implemented system thereby enables composition and integration of desired functionality from pre-existing code fragments without the need for a centralized database administrator or system architect normally responsible for the security posture of a system and eliminates the requirement for identity and access management systems that create walls between enterprises.

In traditional "Web 1.0" (relational) systems, data, and changes to data for objects are stored in relational table structures under centralized control. The right to access and to update or delete object data stored in relational tables is controlled through a database administrator, the application, or both. The data structure and the rights to data are locked into an application, based on roles and permissions defined by the application owner. The centralization of schema and rights limits the application's utility to the scope defined by the application owner and its enterprise. Interoperability with other systems is a challenge as the schema and permissions must be mediated with other systems resulting in exponential increases in complexity as the number of systems and contexts increases. In more modern "Web2.0" systems, permissions are developed socially (instead of centrally managed) while schema and functions on objects remain in closed systems. This allows collaboration on content but not on the behavior and functionality of systems. The disclosed implementations provide for the creation, instantiation, and use configurable distributed ledger objects without a centralized data administrator or a pre-defined application tier.

By leveraging the decentralized nature of distributed ledger technologies (accessibility by any party with a public/private key and no centralized data or application servers), the disclosure enables an ecosystem of user defined class templates to develop and grow fueled by economic incentives for logic contributors disclosed herein, the class templates being the building blocks of a decentralized ecosystem where objects interact in a predictable, immutable manner but with no limit to the type of behaviors that can be modeled and automated. In this decentralized ecosystem, the end user can both contribute to and consume logic, templates, and other utility. The end user can be any authorized party with the means to operate a wallet, that is a public/private key on a distributed ledger.

The disclosed implementations include a series of linked registries to capture and manage the principal objects that enable configuration. A distributed ledger registry includes a smart contract that contains a table defining the structure of the principal object of the registry with each row being a unique instance of the object. For example, the smart contract LogicRegistry described below contains a table and its related data structures with each row representing a registered logical element (smart contract). The registry's smart contract contains logic to create, update, and delete an instance as well as the logic to utilize the registered objects. The various registries of the disclosed implementations are discussed in detail below.

An aspect of the disclosed embodiments is a method, and computer system for accomplishing the method, for creating and managing configurable objects, the objects being executable on a decentralized computing network to affect asset behaviors. The method comprises: specifying, using a creator wallet, a class, required object properties, wherein the class is defined by a class template expressed as a data structure specifying executable behaviors for the class, the behaviors including permissions, interfaces, functions, properties, events, errors, and dependencies assigned to the class, the class template being stored in a class template registry in the decentralized computing network, wherein the creator wallet includes an address on the decentralized computing network; instantiating a configurable object in the item registry, the object having a unique identifier, and a pointer to a class template that is configured to enable desired behaviors of the object; routing, by a trusted control plane, requests from authorized users of the configurable object to affect object behaviors, the trusted control plane a smart contract proxy that ensures the security and authenticity of routed requests, the routing using instructions in the data structure of the class template assigned to the object, the data structure including a map to registered smart contract logic that executes the object behaviors, the logic registered in a logic registry, the logic being in the form of smart contract code that is executable in the decentralized computing network; and executing, via registered smart contract logic the desired object behaviors on a distributed ledger network.

BRIEF DESCRIPTION OF THE DRAWINGS

The foregoing summary, as well as the following detailed description of the invention, will be better understood when read in conjunction with the appended drawings. For the purpose of illustrating the invention, there are shown in the appended drawings various illustrative embodiments. It should be understood, however, that the invention is not limited to the precise arrangements and instrumentalities shown. In the drawings:

FIG. 2b is a schematic illustration of a simplified example of a schema for class registry data structures used to capture class templates, that is routing instructions and other class relationships in accordance with disclosed implementations.

FIG. 4 is an illustration of a user interface creating a for creating a property in accordance with disclosed implementations.

FIG. 10 illustrates an example of an interface specification for smart contract interaction with External Data shared between versions of a smart contract in disclosed implementations.

FIG. 12 is a schematic illustration of a simplified example of a schema for logic registry data structures for registration and certification of smart contract logic in accordance with disclosed implementations.

DETAILED DESCRIPTION

Disclosed implementations provide; a data structure (e.g., in the form of a class template) for capturing the interfaces, functions, properties, events, errors, triggers, dependencies, user rights, and inter-class relationships that enable the creation of end user created classes and affect the behavior of end user created objects; a trusted control plane, implemented as smart contract middleware, leveraging the class template to route state change requests to pre-deployed smart contracts that affect desired class behaviors; a pluggable framework to allow the contribution, certification, and configuration of self-describing logic to enable contributors to safely add and configure new behaviors to the ecosystem; an orchestration layer that detects, records, and affects triggered state changes published by registered logic and activated on the instantiation of an object that incorporates the logics behavior; an authorization structure to provide a flexible system for rights management for user created objects; a session management and security model to secure the system from unintended or malicious activity; a technical mechanism to link objects to wallets to enable interaction between objects and provide accountability for state changes that may involve complex or recursive object structures; a certification process to vet and characterize contributed behaviors; registries that facilitate end user creation and management of objects, classes, logic, interfaces, and object identifiers; and an economics model that incentivizes contribution to the ecosystem's utility, security, and functionality.

Figure 1:
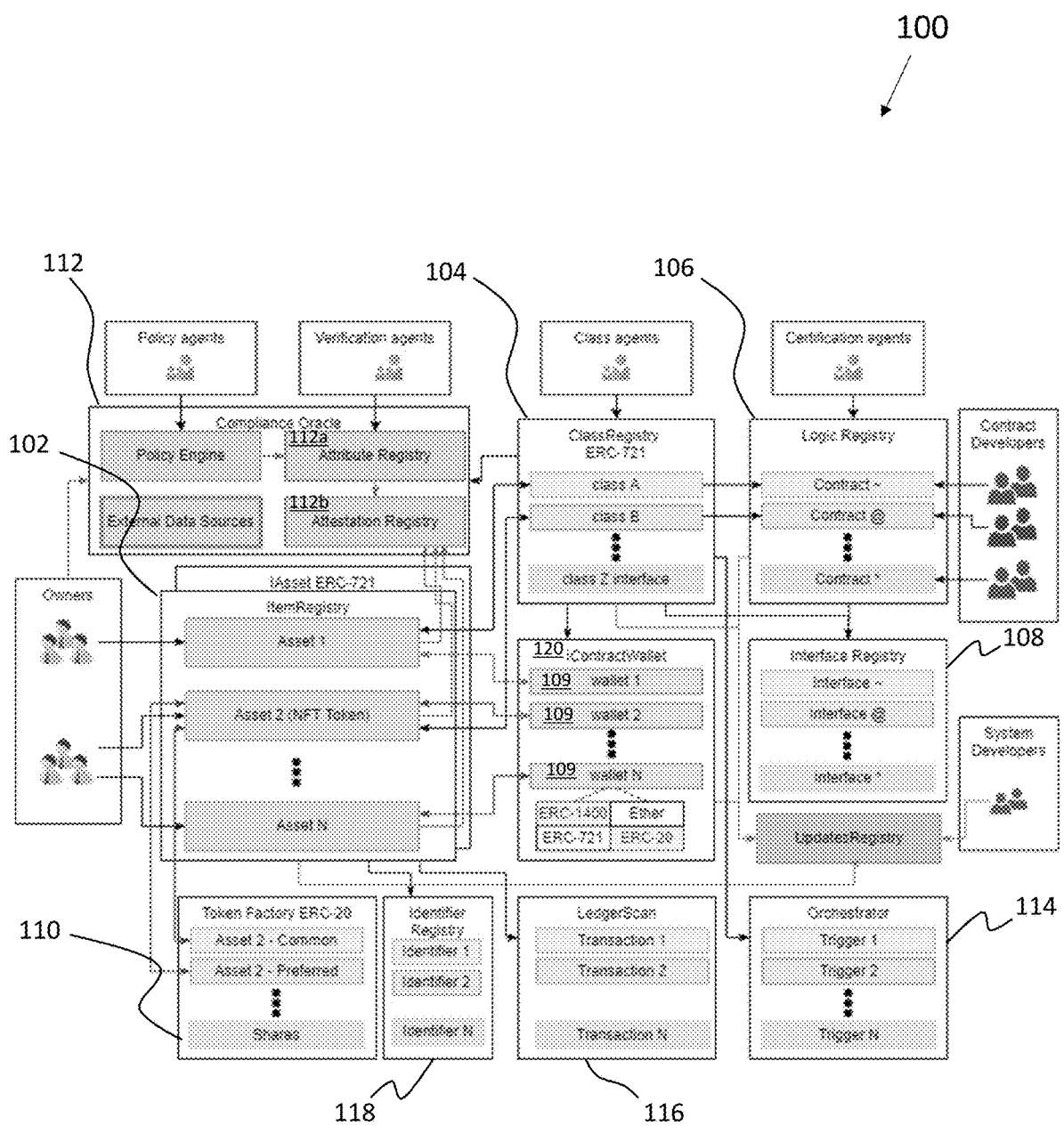
FIG. 1 is a schematic illustration of a decentralized computing environment including the disclosed implementations.

FIG. 1 schematically illustrates a computing system of an example of the disclosed implementations. System 100 includes Item Registry 102, Class Registry 104, Logic Registry 106, Interface Registry 108, Item Wallets 109 in wallet registry 120, Token Factory 110, Compliance Oracle 112, Orchestrator 114, Ledger Scan 116, and Identifier Registry 118. All elements of system 100 can be in the form of "modules" that include software executing on processors of computer hardware coupled to other modules in a manner that achieves the functions described below. Modules can include code, processors, memory, and appropriate network connections.

Item registry 102 can be a module that includes a smart contract (Item Registry) that enables the creation and management of objects, an object being a unique instance of a collection of items, the collection sometimes called a class, the instance exhibiting the behaviors the class of items, the behaviors being the interfaces, functions, properties, events, errors, triggers, dependencies, user rights, inter-class relationships, and other characteristics of the class. As described later, an object, also referred to as an item, can be assigned to a class template in the class registry to exhibit the reusable behaviors of that class. Therefore, the Item Registry is a collection of items from many classes, as defined in the Class Registry.

In financial use cases or other implementations that involve value, objects may exhibit class behavior that extends the basic class, enabling behaviors for objects that represent value within the asset class. The objects may also include a mechanism to transfer ownership of the value and the object exhibits the behaviors (including ownership transferability) of an asset. The object can be represented by a unique token representing the object and its ownership right, in the system 100. Such a unique token is referred to as a "non-fungible token" or "NFT".

Item registry 102 may include smart contract code (ItemRegistry) executing/executable on a DLT system that permits the creation and management of objects in the system in the manner described in detail below. An implementation of ItemRegistry smart contract code may include the trusted control plane logic, session management, and permission enforcement for the system, together enabling the composability of objects, all of which are discussed in detail below.

An object registered in item registry 120 is non-fungible, that is, it is a unique and distinct implementation of the behaviors of a class. Each object has a unique identifier, the itemId, that together with the smart contract address of ItemRegistry, uniquely identifies the object globally and immutably. In addition to other behaviors, the object can be assigned the standardized behaviors ownership and transfer, for example the functions and events exposed by the ERC-721 standard or equivalent, resulting in the object implementing the behaviors of a Non-Fungible Token (NFT).

Each object in ItemRegistry can represent a unique instance of a virtual, or digital representation of a physical item. Examples of physical items can be artwork, real estate, vehicles, or the like. Built on existing practices understood by practitioners of the art, an object provides an accurate and immutable representation of ownership and a unique reference, its itemId. This disclosure extends this practice to enable user configurable objects, where the itemId acts a pointer in the globally distributed virtual machine of a distributed ledger around which behaviors can be configured and affected securely and efficiently.

Other examples of objects whose behavior may be implemented in configurable classes within ItemRegistry include financial assets or processes including funds, companies, futures, forwards, swaps, options and other derivatives, loans, mortgages, bonds, repos, and other credit instruments, collateral and other credit enhancements, bonds, mortgages, leases, insurance policies, and any other financial instrument or process.

Additionally, item registry 120 may be used to create configurable objects for virtual items including, data, documents, cloud or other computing resources, and items that can be viewed or used in a virtual environment such as an online game or a "metaverse", i.e., a virtual-reality space in which users can interact with a computer-generated environment and other users.

Each object in the Item Registry may include a creator wallet (one of wallets 109 that was used to initiate the creation of the object in the manner described below), a creation date, and a pointer to a class in class registry 104 affecting the behaviors of the object. Class registry 104 can be implemented as a module and includes the smart contract ClassRegistry. Each class template registered in the class registry 104 is a data structure defining the behaviors (properties, functions, etc.) of objects associated within the class as described below.

Normally, properties are set at the class level, with permission controls defined by the class owner. However, objects may include additional properties not defined by the associated class and created by the object owner or another party. These $3^{rd}$ party properties can be created and set by any authorized user. The result is more like a tagging model than a formal data model. For example, a party may assign a property, Rating, to a bond object, the rating being assigned by that party independent of the object ownership structure and class defined properties. Such additional properties can be stored as data structures in attribute registry 112a of compliance oracle 112, both of which are described below.

The smart contract ClassRegistry enables the creation and management of class templates. The specific data structures and encoded behaviors of a class template is described in detail later. ClassRegistry defines data structures corresponding to all user defined classes (i.e., templates defining the behavior of objects of a class), each object in the Class Registry defining a class template.

The class registry 104 enables users to create or extend existing classes without the need for generating new code, by populating a template linking to the desired class behavior implemented in existing smart contracts registered in the logic registry 106, which includes smart contract LogicRegistry, and assigning associated properties, data rights, functions and execution rights to this logic. The class template also defines triggers for event processing, and other attributes in the manner described in detail below.

A class template may be updated to extend and enhance the behaviors of a class or may inherit behaviors from previously defined classes in ClassRegistry. By updating or inheriting a class template, the behaviors of an existing class can be reused changing only the differences from the earlier implementation, allowing for efficient reuse of logic and minimal effort to adapt to changing requirements. The update and inheritance process will be described in more detail later.

An implementation of class registry 104 may include an ownership transfer behavior for class templates consistent with the ERC-721 specification (or equivalent on non-Ethereum ledgers) enabling class developers to monetize the value of configured classes and/or transfer this value to others.

The class template data structure can be self-referential. In other words, a class template can be created in the Class Registry which defines the behaviors of class objects, for example the method to map to properties in the Attestation Registry. Instances of a class template, user defined classes, can be recorded and managed in the Item Registry 102 linking to the desired behaviors defined in the Class Registry. Thus, the Class Registry can be used to define its own upgradable configurable behavior supporting multiple implementations of the Registry itself within the framework.

Logic registry 106 can be implemented as a module and includes a smart contract, LogicRegistry, that enables the registration and management of published smart contracts for use in class configuration within the system. Logic registry 106 stores ownership structure, certification status, and usage pricing data for published logic. Logic registry 106 is also used to manage versioning of smart contracts and to enable data reuse between versioned smart contracts using the External Data pattern described in detail within the disclosure.

Logic registry 106 is significant in providing the "Pluggable Logic" capability of the disclosed implementations. Logic registry 106 enables smart contract developers to deploy and register new behaviors for configuration in the class registry and instantiation by user configured objects.

The logic of published smart contracts can be certified by authorized certification agents through use of any combination of manual code inspection, manual testing, and automated testing thereby providing a list of vetted logic for use in class templates. To be certified, logic must, where needed for protected code, implement the session security model (described later) and publish in a standardized format the properties, functions, supported interfaces, events, errors, triggers, and dependencies that provide interaction points for users and other logical elements. Additionally, by scanning for references to third party functions and contracts, the certifier may manually or automatically create restrictions on published logic, enforced at the time of certification, to prevent routing of requests to external logic or data to prevent man in the middle attacks from published logic.

Accordingly, self-describing smart contracts can be efficiently configured and combined by class designers who reference smart contracts stored in Logic registry 106 rather than writing new code. Logic registry 106 may also store details about the smart contract's publisher, publication date, and certification status and provides interfaces to enable users to easily view classes which reference published logic.

In some implementations, logic publishers may charge for use of published smart contract logic. The price for the use of registered logic is stored in the logic registry 106. When a party instantiates an object via the Item Registry smart contract assigned to a class template, the creator may be required to pay a fee for the utility of the implemented class behavior. Since the linkage to the smart contract logic exists in the class template, the logic creator can be paid for the utility of their contribution, through a transfer of value to a wallet associated with the registered logic, for example. This creates an economic incentive for developers to extend the supply of available logic that can be composed into reusable classes. Further, this creates a channel where developers can post code consistent with the environment's specifications that, when certified by the environment owner, can be monetized through use by environment participants, a decentralized ecosystem, that is governed by participants in the ecosystem, that implements the characteristics of Apple's AppStore™.

Interface registry 108 is a smart contract that enables the registration and management of published interface specifications, that is computer code that defines the format for interaction with smart contract properties, functions, events, errors, and dependencies without an explicit implementation of the behavior. An interface is defined as a syntactical format for all interactions with published logic. An interface groups functions, properties, events, and errors that are expected of logical implementation. The interface defines the 'what' part of the syntactical format and the implementing logic defines the 'how' part of the syntactical format. Interfaces are used to enhance interoperability through substitutability, a concept known in computer science as polymorphism. Polymorphism is an important aspect to enable scalability of an ecosystem of dissimilar but related objects by enabling a single implementation of logic that acts on common behaviors of dissimilar classes of objects. When interfaces are implemented, classes may substitute one implementation (smart contract) for another for behaviors represented by the interface. For example, logic that instantiates the behavior of a bond may be very different than logic than instantiated the behavior of a mortgage, but when implementing logic that operates on the interest rate of an object, a common interface permits the operation on these dissimilar objects without coding for each class.

Interface registry 108 can be implemented as a module and includes smart contract InterfaceRegistry which served to decentralize the deployment of interfaces enabling an ecosystem to consolidate around useful patterns without the need for central control of standards. This innovation is designed to manage the scale and complexity of pluggable logic and user defined classes. Interface registry 108 permits user defined interfaces, that is, it provides a mechanism by which end users can publish, register, and describe useful behaviors (functions, properties, etc) that are expected to be present across 1 or more classes. Interface registry 108 creates the conditions by which common patterns can emerge though sharing of useful interfaces. Registered interfaces also facilitate the development of automated integration tests, that is tests that verify the proper behavior of register logic.

Interface registry 108 can be implemented as a module and includes a smart contract InterfaceRegistry that promotes interoperability between logical elements and facilitates much more complex behavior in the ecosystem by enabling elements to work with a range of objects that are dissimilar in implementation but exhibit similar characteristics with respect to certain behaviors. For example, bonds, derivatives, and equity are dissimilar in many respects but all exhibit price properties. Interfaces allow higher level processes to use this similarity to perform price operations on instances of each class. Through the use of a standardized interface, a developer may plug in a new implementation of a service to an object without modifying dependent code, such as upgrading to an oracle that provides a more accurate EUR USD conversion rate at a particular point in time.

The ItemWallet smart contract (iContractWallet in the example of FIG. 1) of wallet registry 120 allows wallets 109 (unique addresses on the DLT system that initiate transactions on behalf of an initiator) to be assigned an object in item registry 102, the object implementing the ownership structure that enables and affects wallet operations. This enables an object to be associated with (i.e., "own") a wallet to conduct transactions (receive or send value and/or cause a state change on the DLT system) in the same way as traditional cryptographic wallets (public/private key operated addresses). Item wallets can only be operated under the permission structure enforced by item registry 102 for the particular object instance (by default, the creator of the object). Implementation of an item wallet 109 enables complex interactions between objects and ecosystem participants as well as between objects themselves. For example, one object may own one or more objects of the same or different classes. The object may implement logic to buy or sell the object it owns or to seize the objects owned by an object it controls. An example of code for implementing and item wallet proxy can be found in Appendix 3. The concept of "proxies" as used in connection with the disclosed implementations is discussed in greater detail below.

Token factory 110 can be implemented as a module and includes a smart contract, TokenFactory that enables the issuance of fungible tokens, in accordance with the ERC-20 or equivalent standard, for example. Fungible tokens are often used to represent fractional ownership, that is share ownership, of assets. Objects in item registry 102 may link one or more share classes, that is non-fungible tokens, to represent beneficial ownership (or other) rights over the non-fungible asset. For example, an object representing a company in item registry 102, may assign two fungible tokens, representing its "common" and "preferred" share classes. Owners of the fungible tokens can exercise rights within the company object based on this ownership. To continue the example, the implementing logic of the company object may require the majority of preferred shareholders to approve a wallet transaction greater that $1,000,000 in value. Upon request for a transfer of $2,000,000, the implementing logic of the company initiates a vote from the linked preferred shares, with the transaction affected only when a quorum of preferred tokenholder has signed an approving transaction. Tokenholder governance on distributed ledger networks is often called a Decentralized Autonomous Organization (DAO).

The intent of this example is not to teach the mechanism of blockchain based voting, but rather to illustrate a novel mechanism for linking the ownership of fungible tokens to authority structures of objects (in some cases non-fungible tokens) in the Item Registry smart contract. Token factory 110 produces fungible tokens with the ability to accept a link request from an Item Registry object. The owner of the Item Registry object initiates a request to link the target fungible token to the object representing the rights of a share class. If the request is accepted by the issuing authority for the fungible token, the fungible token is linked as a share class to the object, transferring issuer authority to the object and assigning to the share class rights to execute behaviors in the context of the object. The linkage between an object and zero to many fungible tokens is stored in the ItemToken table as shown at 210 in FIG. 2a.

Each share class can be assigned one or more rights individually or collectively over the functions of the object. For example, an object in item registry 102 may be assigned to the Company class template, where the object wallet (such as wallet 109) for the object represents the company's treasury function. If the company CEO (a right created by the object) attempts to initiate a transfer greater than an assigned threshold, the class logic can require concurrence from a majority of one or more share classes with votes assigned based on fungible token ownership.

Compliance oracle 112 can be implemented as a module and includes a smart contract, ComplianceOracle, that permits the creation and enforcement of complex policies (rulesets that are evaluated to determine if a proposed state change on the DLT is authorized). Compliance oracle 112 leverages policies, byte code representing the rules to be enforces published to an on-chain policy enforcement "oracle", that determine the authorization of a proposed state change, by interpreting the policy and the data that may be posted from external sources, including off-chain sources. An example of the function of compliance oracle 112 is described in US patent publication 2019/0164151-A1. The Compliance Oracle may be consulted as part of the trusted control mechanism to verify the authorization of a proposed request in the trusted control mechanism.

Compliance oracle 112 includes the smart contracts AttributeRegistry 112a and AttestationRegistry 112b. These smart contracts provide a smart contract based general purpose data management layer with flexible controls to enable a decentralized coalition of participants to: define data schema; share data; manage access and authority to create, update, and delete decentralized data; track provenance and data staleness; and mediate between differing formats for data consumption. These smart contracts allow the creation of arbitrary properties (attributes) that can be assigned to classes or object instance and populated with values based on authorized internal or external sources. AttributeRegistry 112b (the terms "attributes" and "properties" are used interchangeably herein) allows robust and flexible control of data rights for objects and thus facilitates broad use of the framework. The AttestationRegistry 112a records the values assigned to attributes for specific objects. For example, a class template may include a property for interest rate that is pegged to LIBOR. A specific entity is authorized to publish LIBOR data. A smart contract registered in logic registry 106 may depend on this value in its processing logic but does not want to (or need to) control the authority by which this value is set. AttributeRegistry 112a includes logic that enforces the right to publish this data. The class template links the property used by the smart contract to the corresponding attributes in AttributeRegistry 112a. As a new value is assigned in the AttestationRegistry 112b, the smart contract logic has access to this value. Property operations are described in more detail later in the disclosure.

Permission structures used for authorization of transactions of objects in item registry 102 may also include patterns described in US patent publication 2021/0377045-A1 and include: permissions based on assigned roles, memberships, or other corporate structures; workflow based (multiparty configurable human and/or machine sequences) authorizations; and decentralized shareholder voting patterns (DAO). A detailed description of these advanced permission structures is not repeated herein. However, it will be apparent to one of skill in the art that such permission structures can be used by the class designer or object owner in place of the basic authorization structures expressly described herein.

Orchestrator 114 can be implemented as a module and includes a hybrid set of on-chain (on the DLT platform) and off-chain (on a centralized platform or a different DLT platform) components to register triggers for specific objects and execute state changes (e.g., transactions) when triggers are fired. Triggers can also be used feed log files which is an important security function. A trigger is a mechanism that includes code to detect a one-time or recurring event initiated internally or externally with an assigned action to take when the event is detected. Once the event is detected, the trigger affects a state on the DLT based on a task assigned by the trigger. For example, a loan object may have a trigger to update the loan's principal and interest on the first day of each month. On initiation, the loan registers the event in an on-chain data store. The registration of a new event is detected by an off-chain listener which queues up an action to execute when the event associated with the trigger is detected, i.e., when the first of the month occurs in this example. For example, the Orchestrator monitors the list of assigned triggers, and in this case takes the assigned action when an off-chain calendar source detects the first day of each month in a known manner.

Ledger scan 116 is an off-chain stream processing engine that detects the activity of the smart contracts in the ecosystem and records this activity for scalable data-mining, reporting, and user interaction. For example, if millions of objects have been created by item registry 102, it takes significant processing power to filter the list of objects by class, properties, or other parameters. Ledger scan 116 is designed to make user interaction with the elements of the system practical and scalable by, for example indexing object data and presenting the indexed data in an efficient format. such functions are readily apparent to one of skill in the art and thus the operations and structure ledger scan 116 are not disclosed further herein.

Identifier registry 118 can be implemented as a module and includes a smart contract, IdentifierRegistry that creates and manages mappings of external unique identifiers to item registry 102 objects by linking the external identifier and identifier type to the object itemId. Class templates can include a list of valid identifier types including formatting data for the identifiers. An object of the class can be assigned 1 or more of these identifiers to help map the object to external systems. For example, an object of the Company class may have many unique identifiers (LEI, DUNS number, EIN (tax ID), CUSIP, ISIN, and more). Providing a registry to map these external system references to unique objects in item registry 102 simplifies indexing, discovery, and integration of objects with external systems.

Figure 2A:
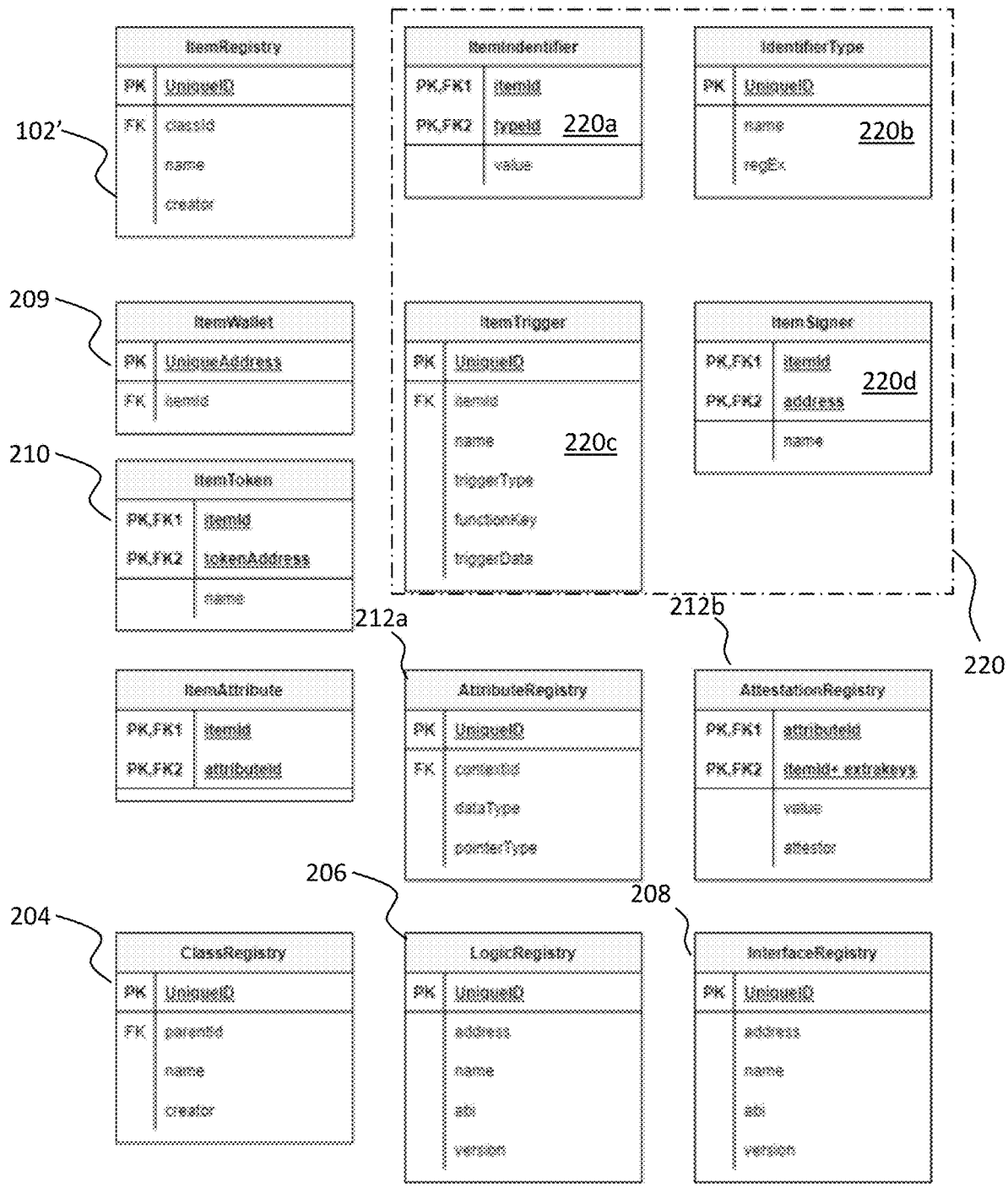
FIG. 2a is a schematic illustration of a simplified example of a schema for core registry data structures in accordance with disclosed implementations.

FIG. 2a schematically illustrates a simplified example of a schema for core data structures in accordance with disclosed implementations. FIG. 2a uses standard database nomenclature indication; "PK" for a primary key in a table and "FK" for a foreign key in a table, which foreign key is a primary key in another table. Item Registry data fields are shown at 202, Item Wallet data fields are shown at 209, Item Token data fields containing the linkage between Item Registry objects and fungible tokens are shown at 210', Item Attribute registry data fields storing the linkage between objects and user assigned properties in the Attestation Registry are shown at 212a, Class data fields are shown at 204 (additional data schema for a class template described later), Logic Registry data fields are shown at 206 (additional logic registry data schema described later), Attestation Registry data fields are shown at 212, Interface registry data fields are shown at 208. Other data structures supporting the Identifier Registry and Orchestrator functions are shown at 220 These data fields and structures are discussed in more detail below.

Disclosed implementations include a mechanism to link an instance of an object to a class (i.e., a set of behaviors that define the object). To create an object that implements a class behavior, an authorized user signs, pays associated fees, and publishes a IssueItem transaction to the Item Registry smart contract on the distributed ledger providing the object Name, class template identifier and other data required to initialize an object of the class. See Appendix 4:

Item Registry Issuing Interface for a smart contract encoded implementation of Item Registry object creation logic. This logic adds a record to the Item Registry including the unique identifier, item Id for the new object, and the class identifier defining the behaviors of the new object as well as other data as desired. The Item Registry supports basic functions such as, GetItems (pulled from off-chain data store, Ledger Scan, as described below) returning a filtered list of all objects meeting the filter criteria; and GetItem returning class and other data for the object identified by the request's itemId.

A more detailed description of each element, and the interoperability of the elements of the disclosed implementations, is set forth below. The mechanism by which system 100 of FIG. 1 leverages the schema of FIG. 2*a* to allow digital assets to be composed in a decentralized computing environment are disclosed in detail below.

The smart contract, ItemRegistry, of item registry 102 includes, or has access to, an on-chain table with each row recording an object created in the framework. Each object will have a unique identifier assigned at creation and a class identifier which defines the behaviors of the object, e.g., the objects implemented interfaces and functions, properties, events, triggers, and dependencies. Authorized users may create new objects and assign behaviors to the objects by calling a CreateItem function of smart contract ItemRegistry. An example of implementation code of item registry 102 for creating and managing objects can be found in Appendix 4.

Figure 3:
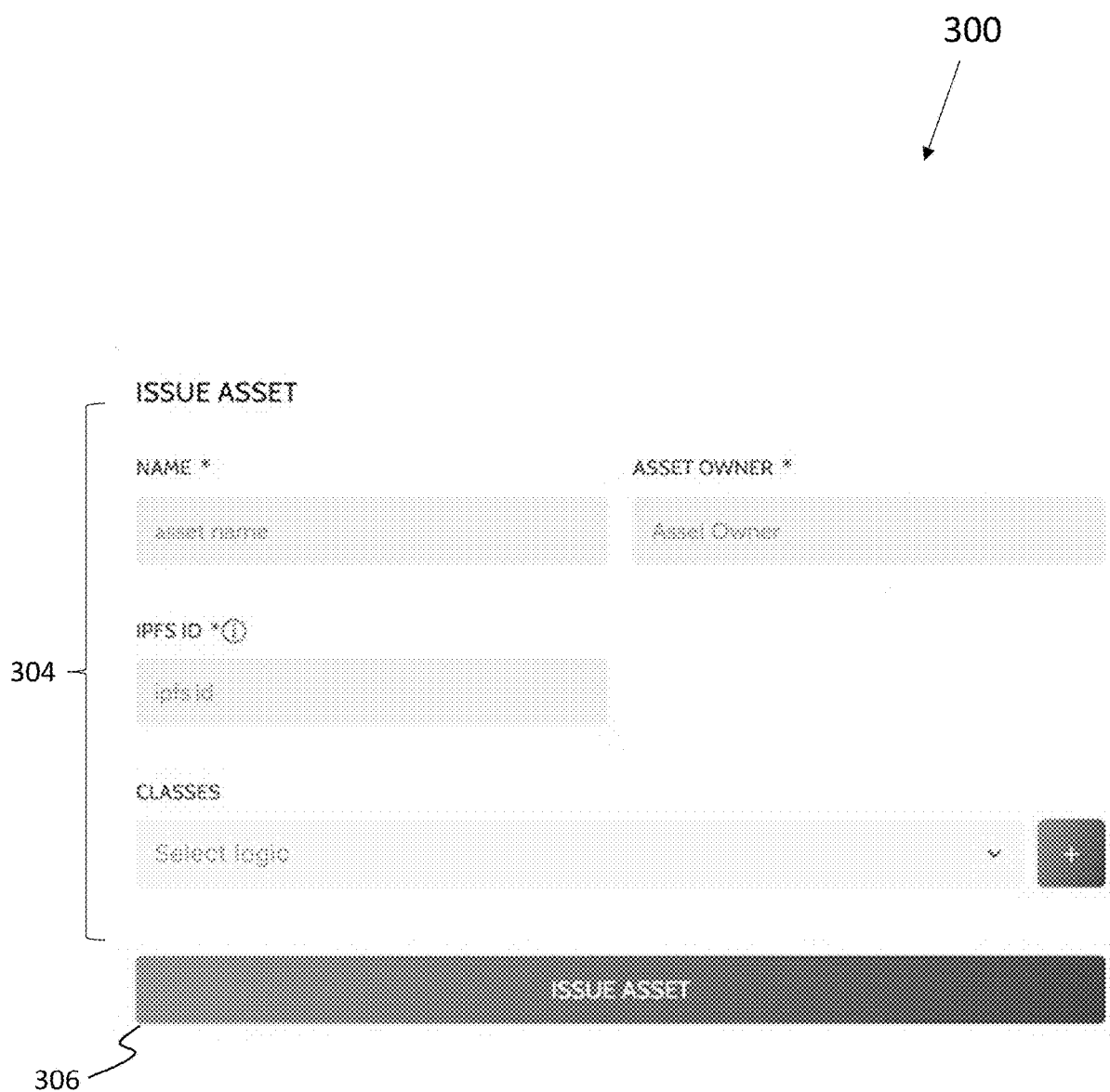
FIG. 3 is an illustration of a user interface for creating an object in accordance with disclosed implementations.

FIG. 3 illustrates a user interface 300 for inputting data to create a new object. User interface 300 permits a user to provide a name, owner address, and a file ID at 304. The file ID points to an Application Binary Interface (ABI), a document that contains the names and types of the function signatured enabled by the class template in an easily parseable format providing a translation between human-intended method calls and smart-contract functions. Class defined smart contract functions have strict conventions about function signatures are optimized an often difficult for a human to decipher. The ABI maps from human readable forms to the precise names and types associated with the functions. The asset can be created by selecting button 306 which formulates and requests signing of a transaction posted to the class registry which results in the creation of the class.

An implementation of the Item Registry smart contract may also support other basic functions associated with the items it has registered such as:

GetItems(filter parameters): returns a list of all created items or items that meet specified search criteria. This list is often drawn from an off-chain data store for performance reasons.

GetClass(itemId): returns the class associated with a specific object.

GetWallet(itemId): returns the wallet associated with the identified object.

GetProperties(itemId) returns a list of properties and assigned values for the identifies object.

Similar functions can be used to operate the wallet (send value) and see a list of transactions for the wallet. A code same for the interface to recover an item's metadata, functions, and properties is shown below.

```
contract ItemLogic {
   constructor (address middleware, bytes32 IPFSLink) { }
   interface IBasicLogic {4
   /**
   * @notice Returns IPFS link
```

```
*/
function getMetaData ( ) external view returns (bytes32) ;
/**
   * @notice Get for logic methods and properties
   * @retrn methods List of the logic methods
   * @retrn properties List of the logic properties
   */
function getLogicMethodAndProperties ( )
external
view
returns (
      bytes4[ ] memory method,
      bytes32[ ] memory properties
);
/**
   * @notice Returns protected methods list
   */
function protectedMethodsList ( ) external pure returns
(bytes[ ] memory methods);
}
```

Other samples of code for implementation of Item Registry 102 basic operations can be found in Appendix 5.

Data mediation between systems is often challenging because different systems may use different keys to uniquely identify an object in a system. For example, US Financial Systems refer to registered investment objects by a Committee on Uniform Securities Identification Procedures (CUSIP) number. While this identifier type is uniform in the US, it is not recognized in international markets where the International Securities Identification Number (ISIN) is used to identify objects. A specific security may be referenced by one or both identifier types. As US Computer Systems transact with European Systems, identifiers need to be reconciled to ensure proper interaction. As the number of objects and identification systems increases, this mediation can result in very difficult reconciliation challenges for financial ecosystems. The problem is particularly acute when trying to uniquely identify companies globally, as dozens of identifier standards are used.

Identifier registry 118 can be implemented as a module and includes smart contract IdentifierRegisty which is designed to address this challenge. The use of the ItemRegistry on a blockchain network enables the creation of an immutable, globally unique, accessible, and composable identifier, the item Id, for any object. While a long run desire may be to have all systems recognize this identifier, it is impractical in the short run. Identifier registry 118 can be used to create an immutable mapping between an external identifier and the item Id, simplifying reconciliation within the ecosystem and with external systems.

As shown in FIG. 2*a* at 220*b*, identifier registry 118 enables creation of IdentifierType, that is a unique external reference format designed to map objects in external systems. CUSIP and ISIN are examples of identifiers for securities. GLEI, DUNS, EIN and other types are used to identify corporate entities. An IdentifierType may include a regular expression to ensure proper formatting of data. To map an external identifier to an item Id, a record is added to IdentifierRegistry (at 220*a*) by an authorized user. Each combination of typeId and value must be globally unique. Zero to many identifiers may be mapped to a single item Id providing the means to reconcile between external systems.

Often, identifier types are specific to one or more classes of objects. Using the schema in FIG. 2*a*, IdentifierType can be associated with one or more classes. The class owner or other authorized user may assign identifier types to the class to facilitate mapping with external systems and encourage indexing of data with the added IdentifierType.

The smart contract of class registry 104, ClassRegistry, includes, or has access to, an on-chain table with each row recording a class template created in the framework. FIG. 2b schematically illustrates and example of such a table 250. As noted above, a class template is a data structure that contains the name of a class, its owner, optionally a wallet operated by the class, and linkages to implemented behaviors that may include interfaces and functions, properties, events, errors, triggers, dependencies, and parent classes from which the class derives its behaviors. The function call GetClasses(filters) is used to obtain a list of available classes that meets the filter criteria. GetClass(classId) is used to return specific data for the identified class. GetProperties, GetFunctions, GetEvents, GetError, GetInterfaces, GetDependencies(classId): returns a list of the specified behaviors/attributes for the identified class. An example of code for implementing Basic Class functions is disclosed in Appendix 7.

To create a new class, an authorized person may identify an earlier class to inherit behaviors if desired. Inheritance and upgrades are described later in the disclosure. The creator adds properties, that is typed (string, integer, Boolean, decimal, pointer, blob, etc.) attributes that can be assigned values for each object implementing the classes behavior.

Additionally, the creator may map one or more smart contracts exhibiting desired behaviors from the list of available logic (in the form of smart contracts for example) in logic registry 106. Since each smart contract describes its interfaces and functions, properties, events, errors, and dependencies, these are added to the class template when selected. Any conflicts between functions and properties can be resolved by the creator. For example, a class may map to two smart contracts in the logic registry 106. If both smart contracts expose a function with the same signature, the class creator determines which function it prefers and creates a record in the ClassFunction table to map the preferred implementation.

Smart contract properties are mapped via the class template. Each connected smart contract publishes its supported properties with a unique propertyKey and property name. As the class creator maps properties from connected smart contracts, a record is entered in the ClassProperty table. This record links the smart contract property, referenced by the propertyKey, to a propertyId in the AttributeRegistry 112a. Property values, also known as attestations, are stored in the AttestationRegistry 112b.

Properties from different smart contracts can be connected to allow communication between smart contracts through connected properties. This is done by connecting multiple propertyKeys to the same AttributeRegistry propertyId. If multiple keys are mapped, each must have the same data type. If the ClassProperty entry is marked as readOnly, the smart contract cannot edit the property. Thus, one or more smart contracts may edit the property value while other contracts that depend on the value may only read the value. For example, one smart contract may be used to set the interest rate property for a variable rate loan, while another can only read the property for loan processing.

Each property and function in the class template is assigned a permission structure as described below. On creation, all assignments for the class template are stored in the class registry 104. Thus, the template defines the behaviors associated with the class.

The class template also stores triggers. As noted above, a trigger provides instructions for how to respond to an event based on, for example, time or activity. Triggers are detected by orchestrator 114, an off-chain element that detects the triggers and takes the desired action when the designated event occurs. Orchestrator 114 operations are disclosed in more detail below. The class template records dependencies published by the connected logic.

Figure 2C:
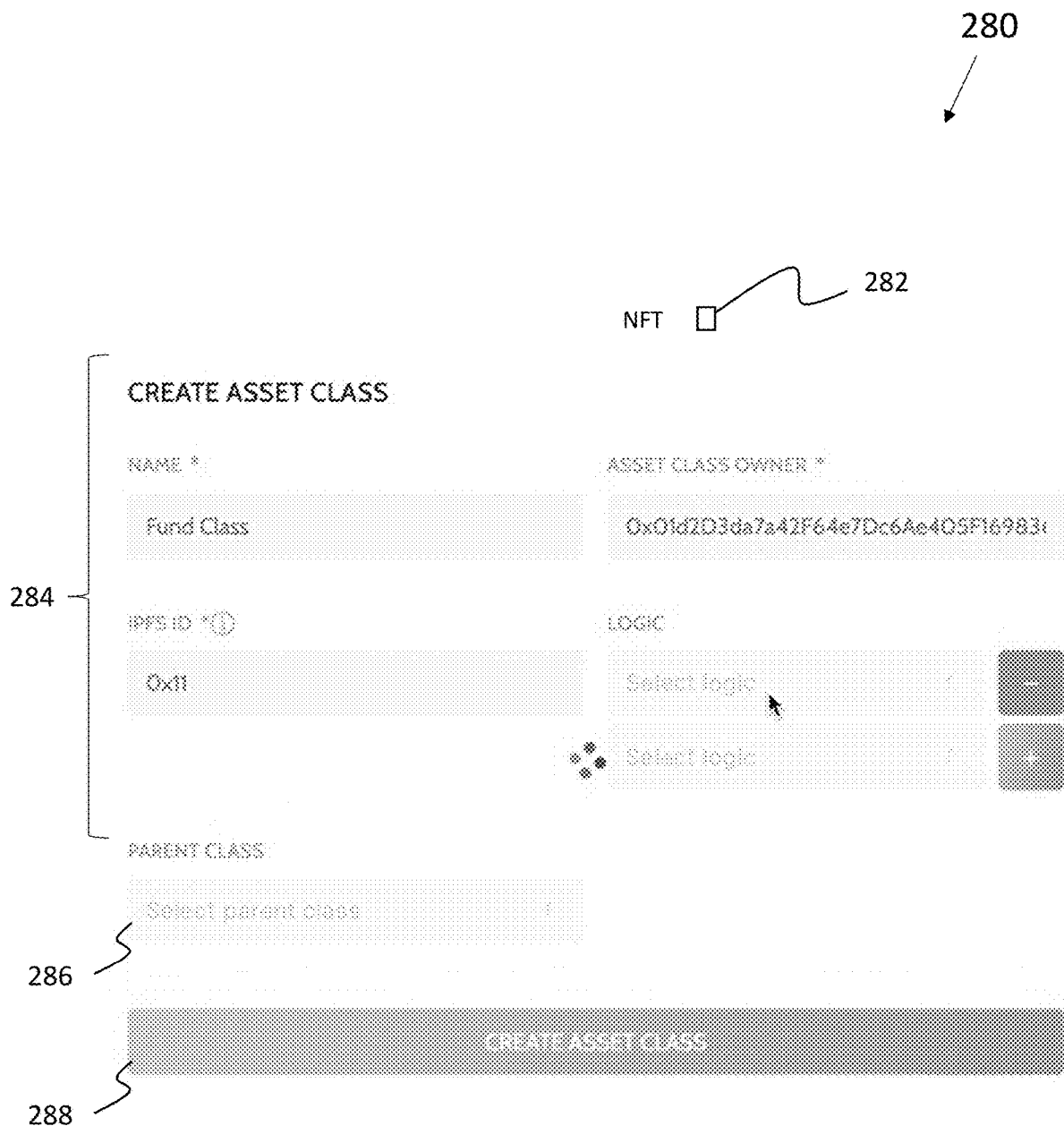
FIG. 2c illustrates a user interface for creating and asset in accordance with disclosed embodiments.

FIG. 2c illustrates user interface 280 for entering data for creating a class. As shown in FIG. 2c. The issuer may choose to create the Item as a non-fungible token (NFT) which implements an interface that allows for transfer ownership using a standardized wallet interaction pattern. This selection can be made through checkbox 282. If checkbox 282 is selected, a record is created in the on-chain table to deploy a non-fungible token which implements, for example, the ERC-721 (or equivalent) interface. Such an interface will allow the object to respond to a transfer request from its owner's wallet. The implementation of NFT functions is a practice understood by practitioners of the art and is not disclosed in further detail herein. Other data that can be entered through user interface 300 is shown at 284. Once all data is entered, Create Asset class button 288 can be selected to create the object. When creating a class template, the user can also designate a parent class, from which the behaviors of the new class are inherited, at 286.

Properties are characteristics of an object that can be assigned values by an authorized party (attestations). An attestation is a value assigned to a property by an authorized party keyed by a reference to one or more objects with an optional expiration. Properties have a specific data type (string, integer, decimal, BLOB (Binary Large Object), or pointer [with a defined class or interface], and more). Properties may be scalar or arrays. Properties marked as read only may be required to be defined upon object creation and cannot be modified by the assigned smart contract. The type and structure of a property is stored in AttributeRegistry 112a. When logic is linked to a class, it declares its own expected properties with an identifying key and name. The class owner maps declared properties to the class template for storage in AttributeRegistry 112a by specifying the read/write status assigning the permission model.

If desired, the class owner may link a property to an existing property from AttributeRegistry 112a, even without a linked logic publishing the property. Each linkage between properties is stored in a corresponding class template in class registry 104 in the data format shown in FIG. 2b in the ClassProperty table. When an inbound request is sent to middleware to get or set property value based on a propertyKey, if the property has been mapped by the class owner, the request is forwarded to the Attestation Registry to get the value of the property mapped to propertyId for the item Id. An example of code for implementing Property Set Operations is shown in Appendix 7.

For example, one smart contract for loans could depend on an interest rate property and another smart contract that calculates interest rate based on collateral. Both smart contracts operate on the interest rate property for the object. In this case both smart contracts publish the interest rate property. At the class level, the class owner connects these properties linking them to one propertyId in the Attestation Registry 112b.

Figure 5A:
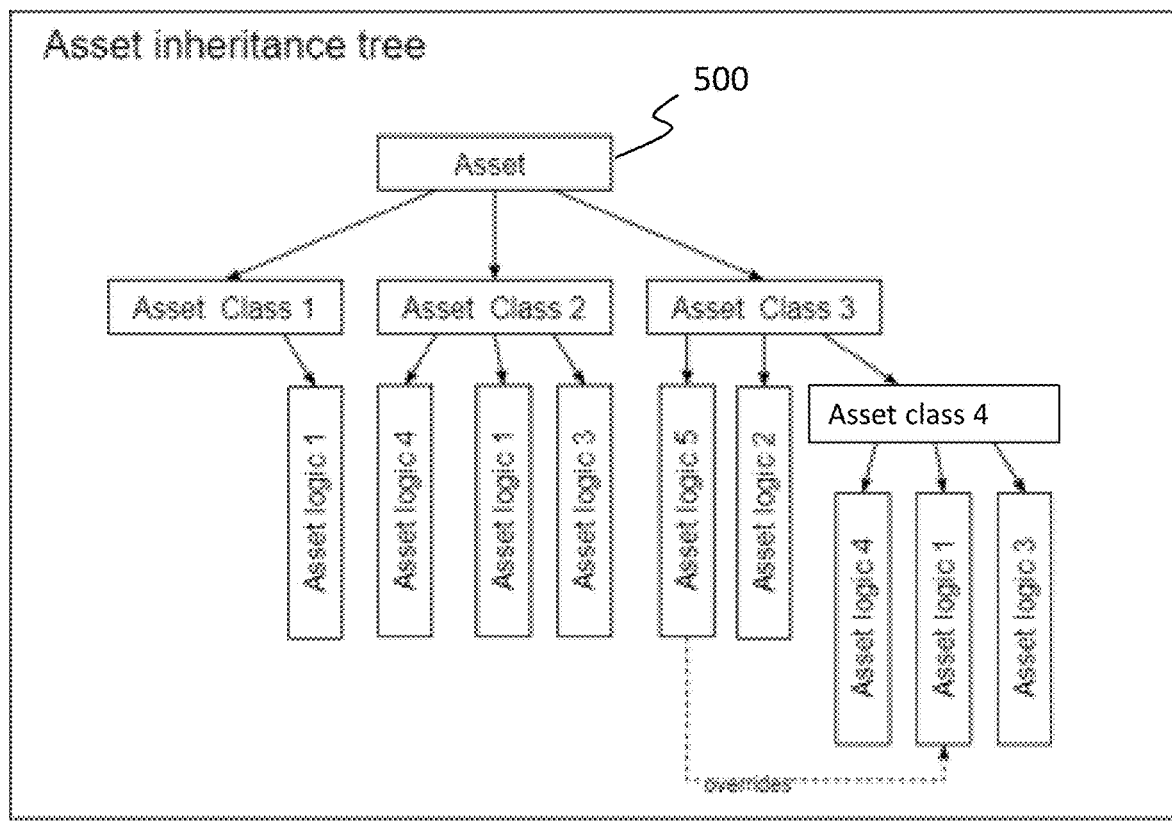
FIG. 5a is a schematic illustration of an object inheritance tree a process flow for creating an object in accordance with disclosed implementations.

FIG. 4 shows user interface 320 for creating a property in accordance with an example of disclosed implementations. A user can enter a property name, control context (as described below), source (if an existing control context is desired), "parent property" from which values and controls are inherited, data type (Boolean, int, decimal, string, datetime, object, file, etc), external ID (the means by which the property is referenced in third party systems), Address on Refuse, expiration time (amount of time before an assigned value becomes stale), description, and any property indexing keys at 324. Property context defines the rights control settings (described below).

class template can store a logic map for a class in the format shown in FIG. 5a. Logic addresses and signatures can be fetched from Logic Registry 106. Each class template maps the address and signature of target functions and adds the permission structure from the control structures below. Since each object stores a class linkage, it can fetch the routing instructions for functions, events, and error messages associated with the class. After an object has obtained and verified the logic address from the appropriate class template, the logic path for the class is cached in item registry 102. Other objects of the same class can then call the logic directly from IItem Registry 102.

Figure 5B:
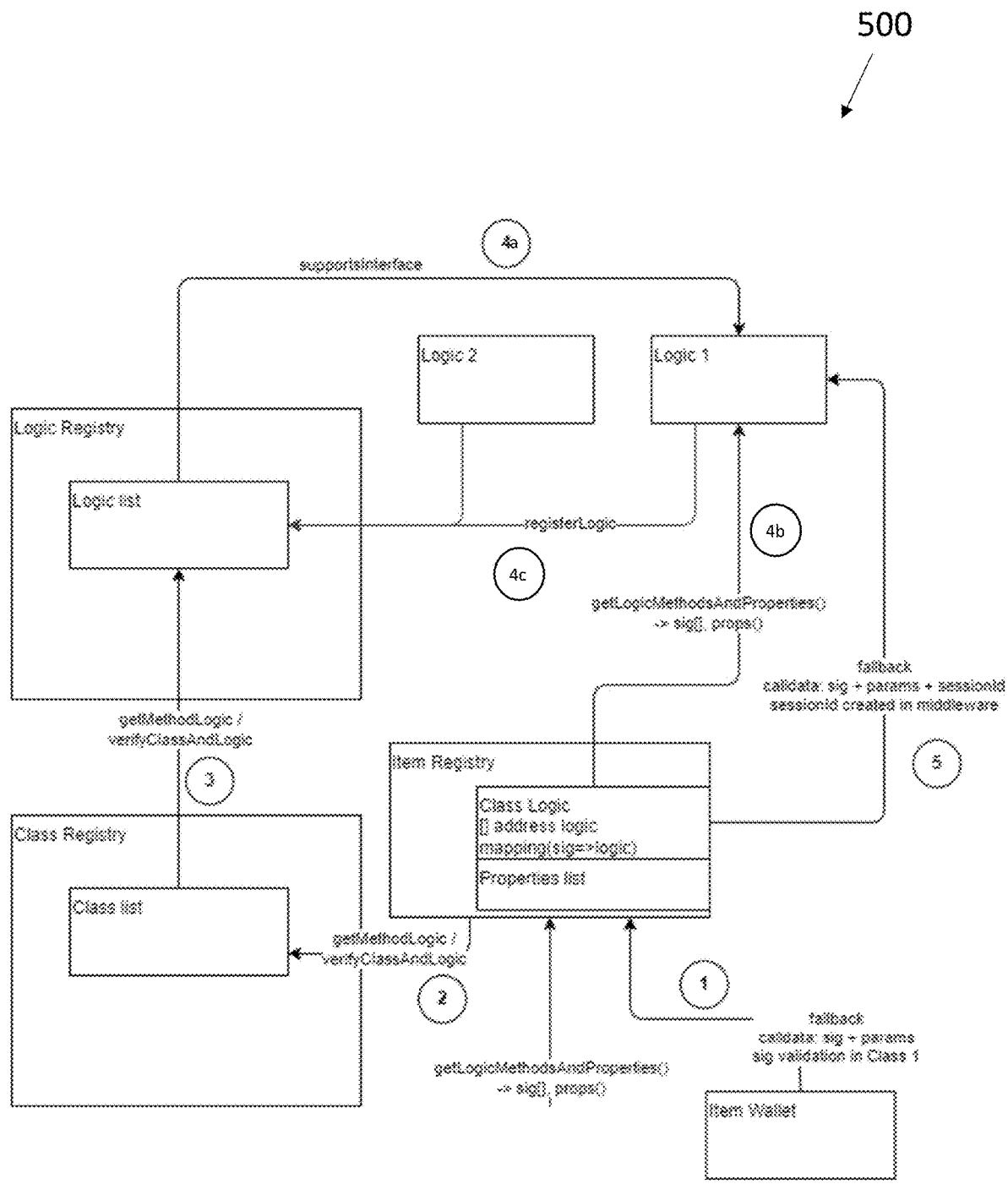
FIG. 5b is a schematic illustration for mapping a function for request execution.
Figure 6:
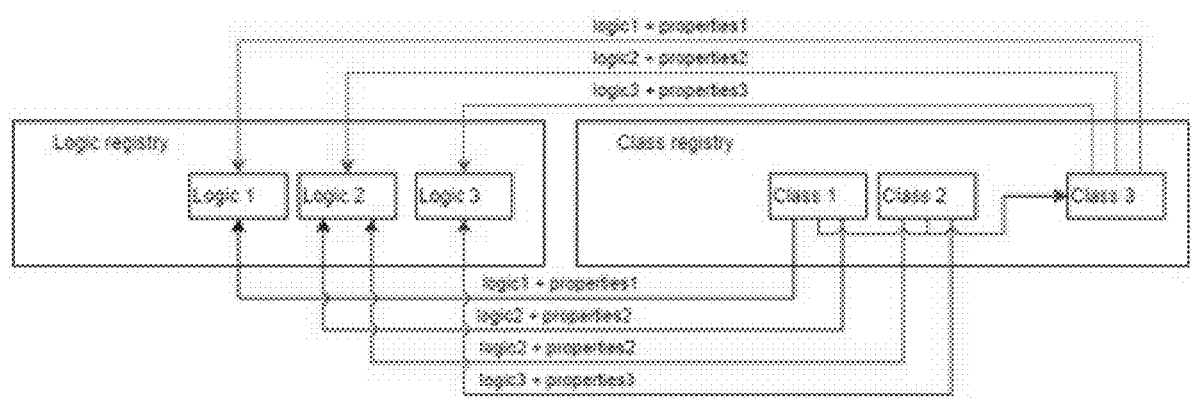
FIG. 6 is a schematic illustration of an example linking/association of classes with logic and properties for classes with inheritance.

FIG. 5b is a schematic illustration of a process flow for mapping a function for request execution based on the class template in accordance with disclosed implementations. As shown in FIG. 5b, at step 1, an item wallet (the owner of the logic object to be created) is validated based on its signature by item registry 102 and the item wallet passes a data structure including request parameters, such as a logic class, logic address, and logic properties to the Item Registry 102. At step 2, the specified class associated with the object is queried to obtain and verify the method signature using the getMethodLogic command. At step 3, the Logic Registry 106 is queried to verify the smart contract logic supports the signature of the request. In Steps 4a-4c the address for target logic is queried and, if valid, stored in a cache in the Item Registry 102 to simplify future calls by objects of the same class. (Logic 1 in this example). At step 4a, the Logic Registry 106 queries the smart contract to verify the designated interface is supported. On success, at step 4b, the Item Registry queries the logic directly based on the address and signature identified in 4a to verify the smart contract supports the target function signature of the user request. Once verified at step 4c, the target function signature for the class is registered in the Item Registry cache. Subsequent requests for this function for objects using the same class template can immediately jump from step 1 to step 5. At step 5, a session is created and the request is routed to the target function for execution by the smart contract mapped via the class template.

To determine if a specified object implements a class, interface, function, event, or property, a requestor may query the Item Registry smart contract using the Implements [Behavior](itemId, behaviorId) where item Id is the identifier for the object and behaviorId is the identifier for the class, interface, function, event or property. The Item Registry smart contract consults the Class Registry to see if the class template provides direct or indirect support for the requested behavior. For example, a requestor may wish to see if an object supports the fund class. The requestor initiates a ImplementsClass(itemId, classId) call to the Item Registry with itemId representing the object and classId represent the fund class template. If the object is assigned a class template that either is or inherits from the fund class, the response would be true otherwise the response is false.

The ItemRegistry.Implements[Behavior] function is often used by 3$^{rd}$ party systems looking to enforce strong typing. For example, the Attestation Registry allows the assignment of objects as properties, where the object is expected to implement the behaviors of a specified class or interface. For example, a loan object may have a property "Collateral" where any assigned object is expected to implement the behaviors of the collateral class (e.g., pricing, forward and release of collateralized assets). If an object is assigned to this property (using the object's item Id), the Attestation Registry should validate that the assigned object implements the desired behavior and reject the assignment if it does not. This pattern assures strong typed assignments. This allows the implementing smart contract for the loan to call the expected collateral functions for an assigned collateral object with the confidence that the collateral object can handle the desired request.

Most properties and many functions are restricted and may only be changed or executed by authorized persons. Since there is no centralized data administrator in the composer ecosystem, the means to assign rights must be flexible and intuitive. Object ownership may change frequently therefore the rights framework must be able to adapt to expected changes in control. To meet these challenges, private, protected, and public control patterns for properties and functions are implemented and extended as described below. Control settings are recorded in a class template for each property and function. A description of control settings for functions and properties is set forth below:

Private—internal. Reserved for control by versions of a smart contract in the External Data Pattern. This type of property is read only for the class template and does not require class configuration.

Private—external. Editable/executable by smart contracts, controlled by the class. This setting allows one smart contract mapped to the class to update properties for another smart contract mapped to the class if the properties are connected. In other words, one logical element within the class may alter property for another logical element. This setting is used to permit communications between logic implemented separately. For example, one smart contract may be used to calculate interest rates, while another uses the interest rate to calculate monthly principle in interest if the logic is connected to the Loan class and the properties are mapped together.

Protected—constant. The class owner specifies the value which is constant for all objects of the class.

Protected—ownerControlled. Editable/executable by item owner. This is a frequently used control. Since most objects are transferable as NFTs and, as part of the NFT interface structure the owner at any time can be known, this control pattern makes rights management practical for frequent ownership transfer of an object between parties.

Protected—creatorControlled. Editable/executable by item creator or designated entity via AttestationRegistry source context. Note: For this control mechanism, a unique AttestationRegistry source is created on instantiation of an object in the class. This allows the object creator to manage and delegate rights using control structures as defined in the AttestationRegistry patent.

Protected—policyControlled. Editable/executable by consulting with the Compliance Oracle to evaluate the right based on attribute based access control and configurable policies.

Protected—classControlled. Editable/executable by wallet specified by the class owner used for execution of "class level" triggers, roles, or other class-wide "global" variables.

Protected—external context. Editable/executable controlled by Attribute Registry context or Compliance Oracle policy. Usually, the values for these properties are set by parties not affiliated with the ownership structure of the class or object. Public. Editable/executable by any party Item registry 102 may implement complex logic to assess the authorization of the initiator to make a function request. Function execution rights are configured and recorded by the class template by storing an authorization model (see property and function authorization patterns described above) with each 4 byte (for example) function identifier. The default authorization model for a function is Protected—ownerControlled. This authorization model ensures the request is made by the current owner of the item before executing. More complex permission patterns, such as the Protected—policyControlled authorization model, involve consulting configurable policy as disclosed in US patent publication 2019/0164151-A1.

In object-oriented programming, inheritance is the mechanism of basing an object or class upon another object or class, retaining similar implementation. Inheritance provides deriving new classes from existing classes such as super class/property or base class and then forming them into a hierarchy of classes. In most class-based object-oriented languages, a "child object" created through inheritance acquires all the properties and behaviors of the "parent object" from which it is derived. Inheritance allows programmers to create classes that are built upon existing classes, to specify a new implementation while maintaining the same behaviors, to reuse code and to independently extend original software via public classes and interfaces.

The use of class templates in class registry 104, allows implementing class inheritance on decentralized networks. To have one class inherit from another, the class creator references the parent class template. The child class stores this reference as a data item in its template. The child class may extend the behavior of its parent by adding additional properties or mapping new logic from logic registry 106. Thus, the child class overrides the parent's behavior by specifying new mapping of functions or properties. When requests are routed using the class template, class registry 104 first checks for extensions or overrides then defaults to the parent class template for routing instructions as described in the middleware description below. Class inheritance provides users a simple mechanism to create, extend, and reuse programmed financial behaviors that can be combined on blockchain ledgers without coding—or extended with light coding of unique features.

Similarly, classes may be easily upgraded. To upgrade a class, the class owner specifies the changes to the class template and saves them. This template is saved as a new version of the same class. The old version is retained. Asset owners must explicitly choose the use of the upgraded class template by accepting the new version, otherwise request will be routed as before using the proxy mechanism described below. This acceptance requirement protects asset owners from undesired changes to object processing.

FIG. 5a schematically illustrates an object inheritance tree based on inheritance data stored in item registry 102 and class registry 104. Asset 400, such as an NFT, inherits attributes and logic from 3 different classes (asset class 1, asset class 2, and asset class 3 in this example). Note that asset class 3 inherits attributes from asset class 4, which attributes will also be inherited by asset 500. Each asset class in turn is associated with various logic stored in logic registry 106. Note that Property/Function override allows a class to inherit an attribute or logic from another class but override, i.e., implement differently, certain functions or properties. This relationship is illustrated in FIG. 5a in which asset class 3 overrides the behavior of asset class 4 as implemented by logic element 1 by substituting logic element 5.

FIG. 5c schematically illustrates the linking/association of classes with logic and properties where Class 3 inherits logic and properties from class 1 and overrides with functions and properties from Logic 1.

As noted above, logic registry 106 can include a smart contract (LogicRegistry) containing a blockchain based table with each row recording the smart contract address and associated data for logic deployed by developers and registered by an authorized user for mapping and execution in the composer framework. Logic registry 106 provides a means for developers to monetize certified code in and App Store model as described in the tokenomics section below. Schema 1200 for supporting basic LogicRegistry operations is shown in FIG. 12. In addition to the data provided via the UI above. The Logic contributor may assign a price for the use of the logic to draw value from its utility as described in the tokenomics section below.

Figure 13:
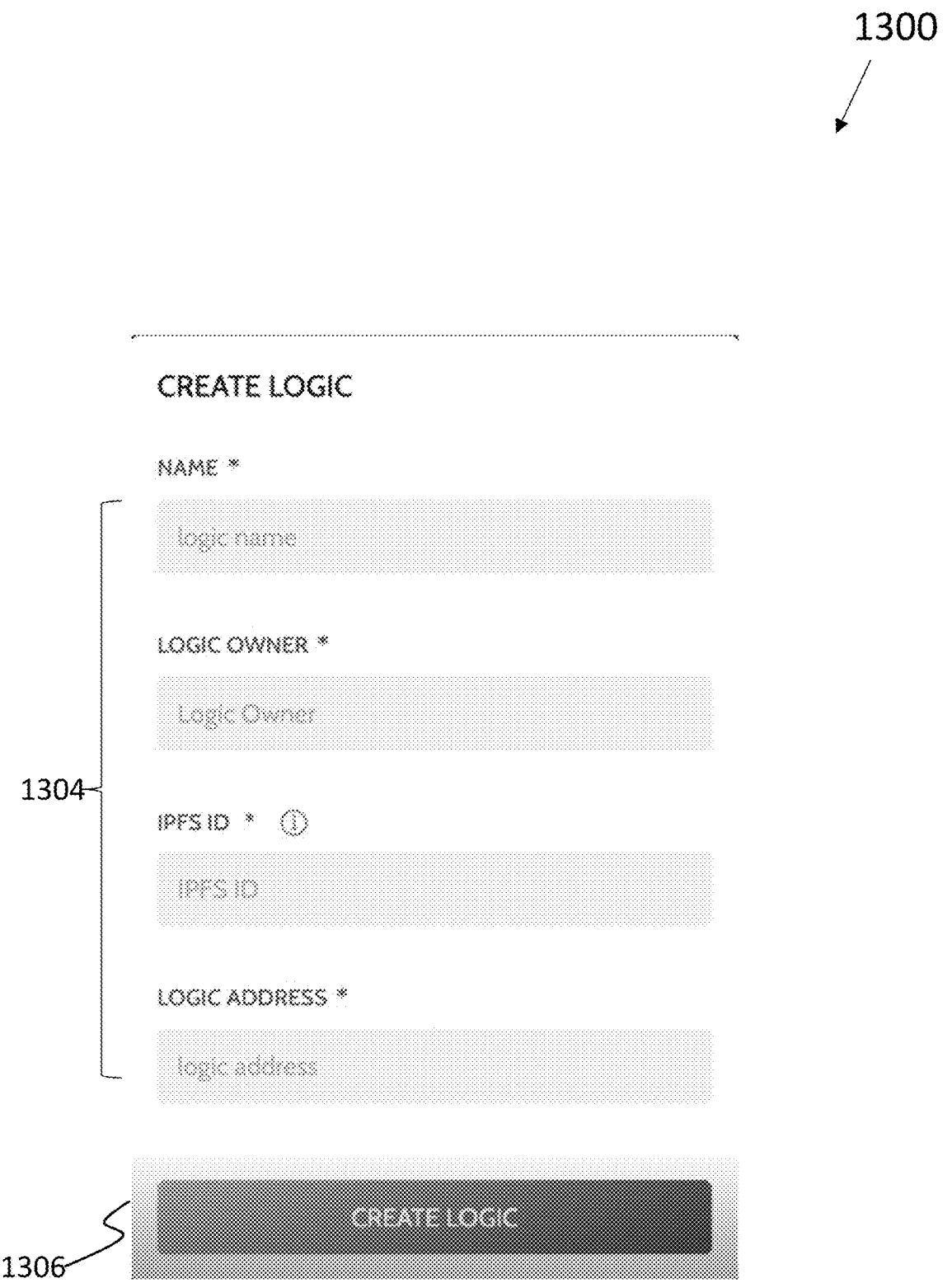
FIG. 13 illustrates a user interface for logic registration in disclosed implementations.

FIG. 13 illustrates UI 1300, a simple mechanism by which an authorized user may publish code to the LogicRegistry by populating a form to give the logic a name, assign an owner wallet, link its Application Binary Interface (ABI) file used to define interaction with the logic, and assign the smart contract address in 1304. The structure of an ABI file is well-known by practitioners and is described in more detail in the Class Registry disclosure. The smart contract can be registered in the Logic Registry by clicking the Create Logic button 1306 and signing the formulated transaction using an authorized wallet address. See Appendix 8 for sample code for the implementation of the Logic Registry interface for registering new logic.

Logic contributors may utilize the ExternalData pattern, as described below, to facilitate upgradability of registered smart contract logic. To use ExternalData, the smart contract publishes properties that are reference by a unique key, propertyId. Values are stored in ExternalData storage. The logic owner may register upgraded logic referencing these same keys, providing the new version of the smart contract access to the same data and reducing data migration costs. Only logic owners may map versions of a contract to the specific propertyIds to prevent leakage between smart contracts.

Objects created in the Item Registry may require actions triggered by external events based on time, other smart contract activity, off-chain or external events, user triggering and other initiation methods. On creation, the object may register one or more triggers which provide instructions detected by an off-chain (that is a system external to the distributed ledger state machine) orchestration engine, such as orchestrator 114 of FIG. 1, to detect and respond to these external triggers. Triggers are stored by Iitem registry 102 in accordance with a schema as shown in FIG. 2a. Data structure 220c defines itemId for which the trigger is registered, the triggerType (temporal, event based, user initiated, etc), the task to be performed when the trigger is detected, other trigger instructions (for example, frequency of the trigger, or the signature for the triggering event). When a trigger is registered, one or more wallets may be designated in data structure 220d that are authorized to sign a transaction initiating the trigger's action.

Orchestrator 114 is a cron with the authority to sign this transaction. Cron is a utility program that allows the input of commands for scheduling tasks repeatedly at a specific time. Tasks scheduled in cron are called cron jobs. Cron is a daemon—a background process executing non-interactive jobs. A daemon is always idle, waiting for a trigger to request it to perform a particular task. The trigger can be input on any computer on the network. The task that is to be executed when the cron is fired and when it should be executed is set by a trigger.

Orchestrator 114 detects registered triggers, listens or waits for the triggering event, and submits a transaction to the Item Registry to affect the desired action. In many cases, triggers are specified by the class template as they are common to all members of the class. The schema for attaching a trigger to a class is shown in FIG. 2b. In this case, when an object is created and the class assigned to the object, the class trigger is registered for the object. For example, a loan class template may assign a trigger for all objects in the class to check back once per month and update the principal and interest for the loan, and/or to update the principal and interest when a payment is made to the loan wallet. For each object that is created for the class, this trigger is registered, the Orchestrator detects its assignment and awaits the trigger for processing. When the time or event occurs, the Orchestrator executes the function, exposed by the Loan class template, to UpdateTerms.

Smart Contract Developers may also publish trigger behavior directly through the logic's self-describing signature. Recommended triggers may be disclosed along with functions, events, properties, etc. Class designers may accept or add to recommended triggers by saving in the class template.

An authorized user may configure the trigger via the class template in ClassRegistry or by directly adding a trigger in Item Registry. The novel pattern disclosed here is the ability for objects to self-describe triggering behavior through ItemRegistry, ClassRegistry, or LogicRegistry, and for an authorized user to configure this behavior without coding.

As discussed above, the framework of disclosed implementations provides for the composability of digital assets by which classes (templated behaviors for a group of objects of a similar kind) can be formed by bundling logic objects (sometimes referred to as "logic elements" herein) that can be in the form of smart contracts. These templates allow routing of function calls (e.g., state change requests) made by authorized users for instantiated objects that have been assigned the class template via a proxy. Generic blockchain based proxy operations are understood by practitioners of the art and are not disclosed in detail herein.

Because smart contracts are immutable, it is not possible to upgrade the code of a deployed smart contract. However, the disclosed implementations leverage the concept of a proxy in a novel manner to configure a computing architecture to enable secure, convenient configuration to upgrade or extend the behaviors associated with objects by mapping newly deployed contracts. The proxy architecture routes message calls through smart contract-based middleware based on configured class templates, that is a data schema on the distributed ledger that can be updated by an authorized class owner, to route the calls to the latest deployed contract logic. To upgrade, a new version of the contract is deployed, and the Proxy contract is updated to reference the new contract address. An example of smart contract code for implementing the proxy model is found in Appendix 1.

To support composability on distributed ledger technologies, that is the means to define and modify object behaviors (properties, functions, etc.) without coding, and to enable the scalable management of objects in a decentralized ecosystem without a central administrator to define object schema and behaviors, the disclosed implementation describes a Decentralized Trusted Control Plane (D-TCP). The D-TCP consists of basic request capture and forwarding system to provide attribution and authorization context; a plugin framework that enabled new smart contract logic to be registered, mapped, and confirmed; a smart contract based middleware to authorize and route requests to implementation logic; a session management framework to prevent man in the middle attacks or unauthorized use of controlled code; a framework to inject code execution dependencies for specialized functions that vary across objects in a class; and a flexible context based permission model to allow data updates and other state changes by authorized parties. Each element of the D-TCP is described in more detail below.

Figure 14:
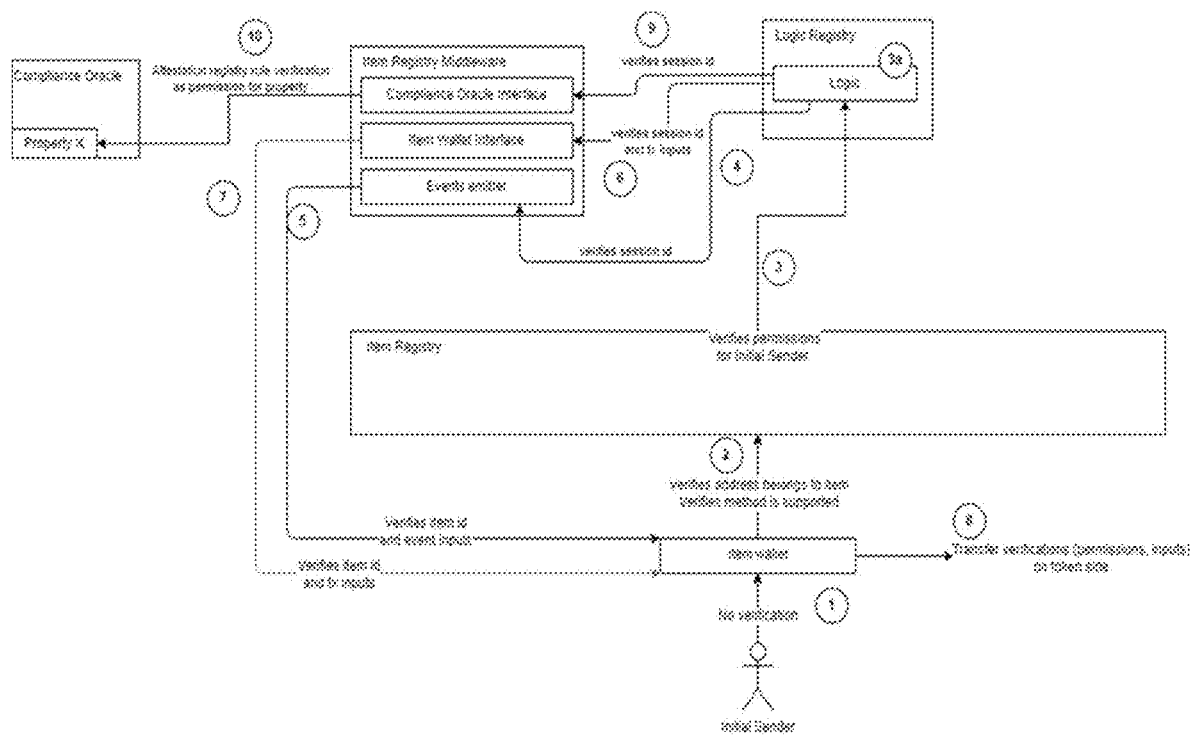
FIG. 14 illustrates the permission decision and mechanism for the trusted control plane during execution of a requested state change.

FIG. 14 highlights key permission decisions enforced by the D-TCP. At 1, the transaction initiator submits a request to the Item Wallet 109 smart contract. In a permissionless DLT, and user may submit any request for execution. The accessibility and ease of use of DLTs provides many advantages to global adoption but places a burden on code execution to ensure that only authorized state changes are allowed. The D-TCP is responsible for ensuring trusted execution based on a flexible, scalable, and decentralized authorization framework. At 2, the Item Registry 102 smart contract verifies the referenced object is associated with the wallet designated in the request and verifies the requested method exists. At 3, the Item Registry 102 smart contract evaluates the permission of the sender to execute the desired function based on the permission context assigned to the action (as described above), and id authorized creates a session identifier to ensure routed requests occur in the context of an authorized session. At 3a, the referenced smart contract verifies a valid session exists for execution. This is to ensure requests that have not been routed via the D-TCP authorization structure are not executed. For event emission, at 4, the Item Registry Middleware verifies the event or error message is initiated by registered logic is occurring in the context of an authorized session. At 5, the Item Wallet smart contract verifies the item Id and event inputs match the referenced wallet. For Item Wallet transactions, at 6, the Item Registry Middleware verifies the request initiated by registered logic is occurring in the context of an authorized session. At 7, the Item Wallet smart contract verifies the item Id and transaction inputs match the referenced wallet. At 8, the external smart contract associated with the token transfers applies internal authorization logic, if applicable. For data storage, at 9, the Item Registry Middleware verifies the data request is occurring in the context of an authorized session. At 10, the Compliance Oracle 112 verifies the authorization to read or write data based on the assigned context.

Figure 7:
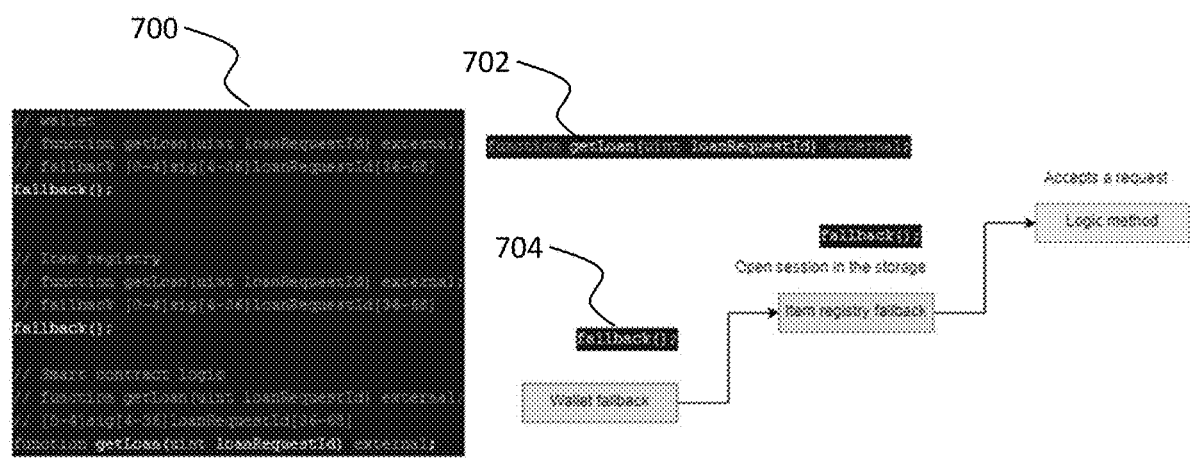
FIG. 7 is a schematic illustration of a basic function request pattern used in connection with disclosed implementations.

FIG. 7 illustrates the basic function request pattern used by D-TCP in connection with disclosed implementations. A user initiates a request by publishing a signed transaction request to a blockchain node. In this example, the user is requesting information about a loan associated with a particular loan request through the function shown at 702. The mechanism for signing and publishing transactions in a DLT system is well-known and understood by practitioners of the art and is not described in detail herein. The published transaction is executed via the ItemWallet smart contract (such as iContractWallet of FIG. 1), which includes code 700, using the fallback function shown at 704, a fallback being a catch-all interface capturing all inbound function requests that do not map to a defined schema. The code executed by the fallback function allows generic processing of all non-specific inbound requests and is useful for routing all inbound requests via the proxy to specific smart contracts that execute the function associated with the request signature.

The published transaction includes the source wallet, a 4 byte function identifier, and other data specific to the desired function. Since the published request includes the source wallet which is linked to a specific object in Item Registry 102, the request can be routed to the fallback function of Item Registry 102 including the identifier for the object in Item Registry 102. By routing in this way through the Item Wallet contract, the context of the request can be set and the permission structure unique to the object can be applied for attribution and authorization. The Item Registry smart contract then assesses the authorization status of the requestor for the specific object instance based on permissions for the requested function call (as described in the properties and functions control context section above), and if authorized, creates an open session for the request and obtains the smart contract address for routing the call based on the function identifier (as described below). See Appendix 9 for Request Permission interface sample code. Once authorized, the call is routed to the implementing smart contract for execution. If the function is a controlled function (results in a state change), the implementing smart contract validates the existence of the open session and executes the code for the requested function. A sample implementation of Item Registry Proxy operations code can be found in Appendix 1.

Figure 8:
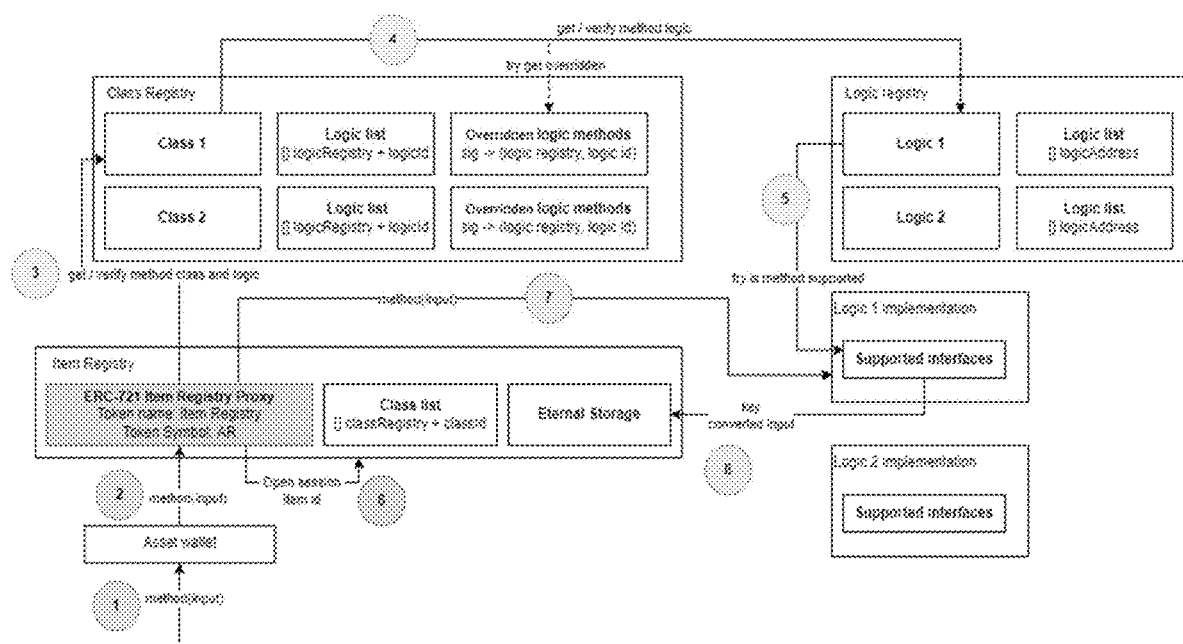
FIG. 8 is a schematic illustration of a sequence of interactions for the plugin asset composing framework of disclosed implementations.

The sequence of interactions for the plugin composition framework of D-TCP disclosed implementations is described in FIG. 8. In steps 1 & 2, the request is routed as defined in the Basic Function Request description above. If a function, identified by the 4 byte function identifier in the request has been requested previously for the class associated with the object, the routing information is obtained from an internal cache in the item registry 102 and the sequence skips to step 6. The route cache is a combination of classId, smartContractId, and 4 byte function identifier. If the route has not been cached, the flow proceeds to step 3 to determine the path to the requested function and validate its existence. In step 3, the Item Registry smart contract requests a pointer to the function from class registry 104 using the class id associated with the object associated with the request. Based on the classId, the ClassRegistry smart contract retrieves the class template and determines the smart contract associated with the request. In step 4, the class verifies the existence of the referenced logic that has been published to the Logic Registry. If the class is inherited from a parent class (describe in class template structure), the designated class template checks for overridden functions and if not present, points to the parent class to obtain the mapping. In step 5, the reference smart contract is queried to see if the desired function exists. At this point, the plugin is validated, and the function is registered for future use by storing the routing information for the function associated with the class in the Item Registry route cache. When a validated plugin is called, a session is opened, as shown in Step 6, using the method described in the Basic Function Request description. In step 7, the function request is routed to the targeted logic for execution. Step 8 highlights a case where external storage is called by the targeted function. External storage may be used to provide continuity between smart contract versions. This pattern and other requests routed back to the middleware of item registry 102 are described below.

Thus, the Item Registry smart contract performs critical middleware tasks to route requests to internal and external logic while maintaining the security controls and accountability of the system. This enables composable data schema and application functionality without the need for a centralized database administrator or system architect normally responsible for the security posture of a system and eliminates the requirement for identity and access management systems that create walls between enterprises.

The D-TCP middleware permits secure interaction between objects and external smart contracts by ensuring that request routing is intentional, registered, authorized, and consistent with a valid session. It may also ensure that requisite functions and services are triggered, such as event logging. This component also allows complex operations where one object has rights to affect another object in one or more ways. For example, one object may own another object (for example, a fund that owns one or more performing loans). Or one object may have another as a property (for example, a loan may have assigned a collateral object to support its implementation). When a controlling object executes a function on an object or data that it owns or otherwise controls, the source of the request must be traceable to the originating request to prevent an injection attack (unauthorized logic attempting access) on the controlled object or data.

Figure 9:
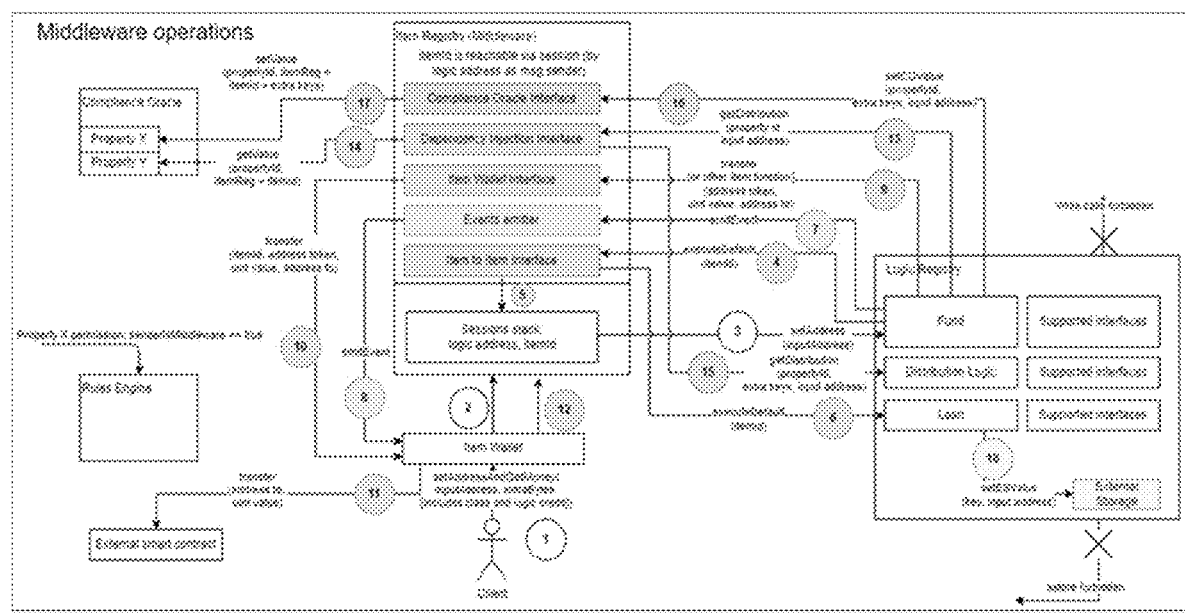
FIG. 9 is a schematic illustration of sequencing of the middleware operations of disclosed implementations.

FIG. 9 illustrates an example sequencing of the middleware operations. Function requests are initiated and routed to smart contracts registered in Logic Registry 106 in Steps 1-3 as described in the basic function request pattern. In order to prevent malicious smart contract code that could improperly route user-initiated calls, Logic Registry 106 does not permit calls to unregistered smart contracts or data stores. If external calls or data write operations are required as part of function execution, they are called via the middleware functions enacted in the Item Registry 102 smart contract using one or more of the patterns as shown in the diagram: item to item interface, events emitter, item wallet interface, dependency injection interface, compliance oracle interface, or external storage.

The Item-to-Item Interface pattern is used to route function calls between objects in the Item Registry 102. While a number of object-to-object relationships may require this pattern, one example of an object controlling another object is when the controlled object is in the wallet of the controlling object as could be the case for a fund that owns one or more loans as assets. If during the execution of logic from one object (Step 3), the logic requires execution of logic from a controlled object, the executing smart contract calls the item-to-item interface of the Item Registry 102 Smart contract passing the details of the proposed transaction in the request (Step 4). Once the sessionId is validated and permission is verified for the executing thread, a new session is created for the controlled object (Step 5). Then the request is passed to the target smart contract via the proxy based on the controlled object's class template (Step 6). Another example of Item-to-Item routing is when controlled object is a property of the controlling object as may be the case for a loan that has an associated collateral object.

The Event and Error Emitter pattern is used to publish events and errors associated with an object. To provide a consistent listening point for events and errors associated with end user transactions, object events should be published from the Item Wallet 120 smart contract. Therefore a relay system publishes events and errors that occur in the target smart contract to detect and publish the activity via the Item Wallet smart contract, the point of interaction for the initial request. To utilize the Event and Error Emitter pattern, the function called by the initiator (step 3), emits an event (Step 7). This event is detected by the events and errors emitter of Item Registry 102. The event emitter throws an event detected by the ItemWallet smart contract (Step 8). The ItemWallet smart contract then throws the event referencing the affected wallet address. See Appendix 11 for detailed implementation of the Item Wallet Emitter function and Appendix 12 for the Item Registry Emitter code.

The Item Wallet pattern is used to operate value or execute functions via the object's wallet. An implementation of this pattern would be a call to one or more external smart contracts to transfer value from the initiating object's wallet. For example, if the initiator calls a function that executes a transfer of an ERC20 asset from the fund's wallet, the executing code will call the Item Wallet interface of the Item Registry smart contract (Step 9). The Item Registry smart contract will validate the session assigned to the request and, if valid, call the Item Wallet smart contract to execute the request (Step 10). The Item Wallet contract executes the request by calling the proper function in the external smart contract required to transfer the assets (Step 11). If requested by the calling function, The Item Wallet 109 can call other supported actions including requests to transact with other Item Registry 102 objects (Step 12).

The Dependency Injection pattern leverages polymorphism, i.e., the ability to substitute one logical implementation with another by leveraging interfaces, to permit pluggable logic to permit diversity in the implementation of desired functions between objects assigned a specific class. This is discussed in greater detail herein in the description of the dependency injection. For example, two different instances of a fund class may implement different logic for distributions. The first instance uses default logic, while the second instance requires specialized logic and complex rules to determine distributions to a range of associated share classes. In this case, the smart contract that implements the fund distribution logic may declare a dependency injection point. When the function called by the initiator (Step 3) includes a dependency injection point, the function initiates a request to the item registry dependency injection interface (Step 13). Once the session is validated, the item registry 102 queries the Compliance Oracle 112 for the value assigned to the property representing the injection point (Step 14). This property contains the address of the implementing smart contract for the desired function. If no property is assigned, control returns to the calling function, or an error is thrown depending on the implementation. With the endpoint defined, the request is routed to the desired function in the designated smart contract (Step 15). On completion, control and resulting data is returned to the calling function.

The Compliance Oracle pattern is used to write data to Attestation Registry 112*b*. Compliance Oracle 112 and associated Attestation Registry 112*a* include smart contracts used to manage the storage and update of data to be used by authorized smart contracts. These smart contracts permit complex rules for the management of data including policies for read and write access. Basic operations of the Compliance Oracle 112 in accordance with disclosed implementations are described below. Trust between the Item Registry 102 and Compliance Oracle 112 is required. For example, Item Registry 102 should be verified as a legitimate source of request context.

To write data to the Compliance Oracle 112 for display or use by the object and smart contracts associated with its class, the function called by the initiator (Step 3) places a request to the item registry compliance oracle Interface containing the desired property, additional key data if desired, and the data to write (Step 16). Once the session is validated, the Item Registry 102 smart contract initiates a request to compliance oracle 112 to write the data to the desired property (Step 17). Read/Write access to properties can be set based on the class template and may be controlled using a range of techniques, such as those described below. Two important patterns are protected-owner controlled and private-external write permission. Protected-owner controlled rights default to the object owner but may be updated by the owner via compliance oracle 112. Private-external rights are controlled at the class level, meaning smart contracts assigned by the class in a valid session may set the variables without additional permissions.

The External Storage pattern is used to permit data operations by a logic registry smart contract where the smart contract operates on private internal data (described in more detail below) such as data specific to a smart contract implementation or any of its upgrades. A smart contract writing to the external data store within the Logic Registry calls the setESValue function supplying key and data information (Step 18).

FIG. 10 provides an example of an interface specification 1000 for access to external storage. The Get, Set, and Delete functions are used to read and write data from a smart contract registered in logic registry 106 to ensure the data is persisted across smart contract versions. Each version of the contract is granted access to the data based on the key controlled by logic registry 106 and shared across all associated smart contract versions.

Session operations in the D-TCP middleware, as described above, are the mechanism by which security is assured when routing control between smart contracts. Specifically, this model is designed to prevent both unauthorized execution and "man in the middle" attacks, that is, logic that routes an authorized request to an unauthorized execution location. Smart contracts executing controlled logic (non-public functions) should have a mechanism to ensure the request came from an authorized source, and in some cases, require knowledge of the initiator of the request. Since the logical interfaces of contracts registered in logic registry 106 may be called from any source, non-public functions verify the request is linked to an open session by matching the request with an entry in the session stack. item registry 102 uses the Session Stack to register authorized requests. The receiving logic registered in the logic registry 106 validates the existence of a proper entry in the session stack to authorize the execution of a desired function. See Appendix 2 for an example of implementing code for session operations.

Figure 11:
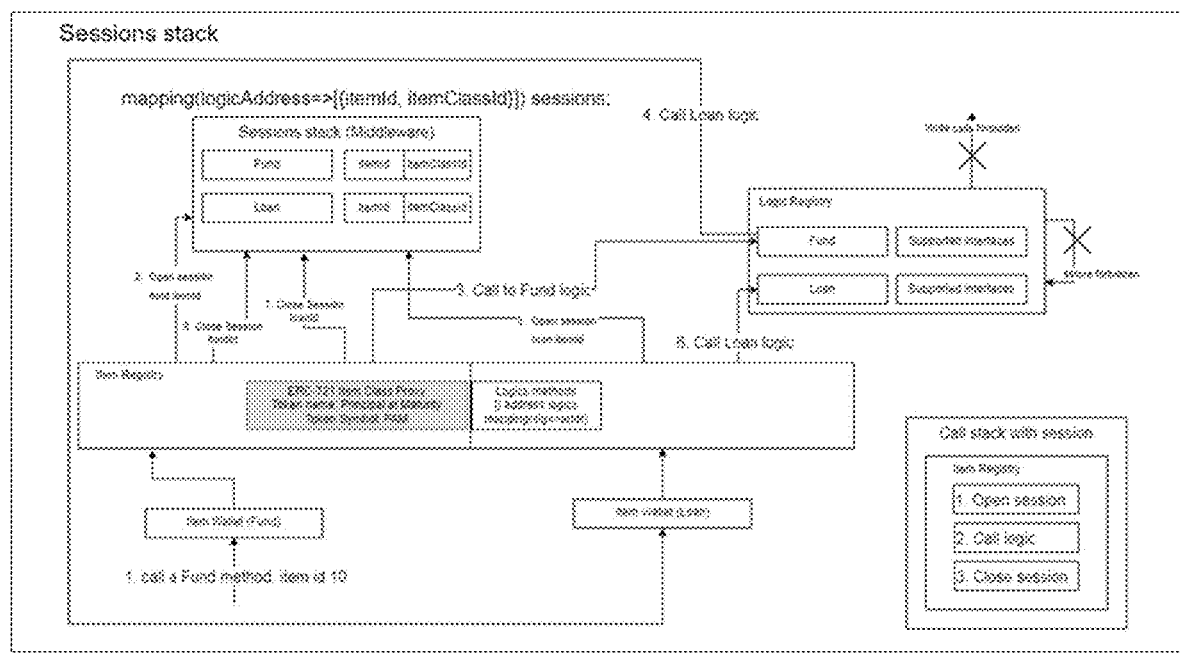
FIG. 11 is a schematic illustration of an example of session operations of disclosed implementations.

FIG. 11 illustrates an example of session operations for a transaction involving multiple objects. An initiator (e.g., a fund owner) initiates a request by calling the Item Wallet smart contract as described in the Basic Fund Request section (Step 1). This request is routed to the Item Registry 102 smart contract. After validating, the initiator is authorized to make the request, Item Registry 102 creates a new session identifier in the Session Stack (Step 2), the record containing the itemId, item classId, [and initiator, source contract (if any)]. Item registry 102 then routes the request for execution to the designated function implemented by the smart contact based on the associated class template (Step 3). The receiving smart contract validates the session by checking the session stack and executes the desired function. In the example flow, this function requires execution of logic from a controlled object, an object implementing the Loan class and associated contract in this example. To call a function exposed by the controlled object, a request is generated containing the controlled object's wallet, the function identifier, and function parameters as described above (Step 4). This opens a session (Step 5) and routes the request (Step 6) as described previously. After execution, the sessions opened for processing the request via the Loan (Step 7) and fund (Step 8) are closed.

The phrase "dependency injection" (DI) refers to a software programming technique in which an object receives other objects that it depends on, called dependencies. Typically, the receiving object is called a "client" and the passed-in ('injected') object is called a "service." The code that passes the service to the client is called the "injector." The injector tells the client what service to use [injection is performed by the party with edit rights to the property containing the path to the implementing logic]. In examples herein, the injector is the Item Registry middleware.

DI can be used to maximize code reusability while allowing highly specific elements to be substituted efficiently on a case-by-case basis. For example, financial funds might exhibit similar and predictable behaviors for most functions but vary broadly in asset management strategies and distribution rules. Through DI, general fund logic can be reused while specific logic for asset management and distributions may be injected, or "plugged in" to handle the complexity and uniqueness of each implementation. A novel data structure and implementation model is required to permit dependency injection on DLT networks. The base behavior of an object is defined at object creation. However, a new behavior cab be injected by an authorized entity at any time.

Using D-TCP, smart contract logic posted to logic registry 106 may publish dependencies, i.e., points in the code execution where logic is expected to be plugged in. In the disclosed implementations, a dependency is a property with a declared interface [or class], the interface being selected from a list of supported interfaces published to interface registry 108, identified by a logical element, the property containing the address of logic implementing the interface [or class], the logic executing when the client function code encounters the injection point. For code to be injected during function execution, the property must point to a smart contract that implements the declared interface. Support for the declared interface is verified when the property defining the dependency is set using a verification pattern in the manner discussed above with respect to FIG. 7.

When logic publishing a dependency is mapped to a class, the class registers the dependency as a property and specifies the permission structure expected for the property. Often the dependency will be read only and is specified by the object owner on creation of an instance of a class. For example, a lending pool operator may inject the loan execution logic (e.g., variable vs fixed) offered by a pool on the creation of the pool or even the issuance of a loan.

An implementation of the disclosed model may include economic behaviors to exchange value between participants and create economic incentives for ecosystem growth. This disclosure introduces a method to incentivize economic behavior encouraging the growth of the ecosystem and, if desired, the decentralization and autonomy of the governance of the disclosed model. Covering governance mechanisms and financial incentives, it aims to share a vision of alignment between various stakeholders in the system using a fungible token representing the utility of the contributions of ecosystem participants and enabling the exchange of value in the protocol. In blockchain parlance, the economics facilitating the exchange of utility on a blockchain network within an ecosystem and using a token is called it tokenomics. The utility token underpinning a composable network may be used for: the exchange of value between participants, access to services, decentralized financial functions, security and certification functions; and governance of the ecosystem including decisions to upgrade key elements of the ecosystem. The tokenomics and related behavior incentives disclosed herein can be used in whole or in part. Further various other incentive mechanisms, economic and otherwise, can be used in connection with disclosed embodiment.

Expected participants in the ecosystem include: Protocol Developers, Logic Creators, Logic Validators, Class Creators, Asset Creators, and Asset Users.

Protocol Developers (PD) develop and maintain core elements of the ecosystem including the Registries and D-TCP functionality.

Logic Creators (LC) are individuals and companies who have deployed smart contract logic and registered it in the Logic Registry 106.

Logic Validators (LV) are assigned via the ecosystem governance model (centralized or decentralized) that review and validate registered logic using manual or automated processes to ensure a proper fit for the ecosystem. This role is critical as it becomes the gatekeeper for the form and function of the ecosystem.

Class creators (CC) are individuals and companies who are authorized to create class templates in the Class Registry 104.

Asset creators (AC) are individuals and companies who are authorized to create objects in the Item Registry 102.

Asset users (AU) are individuals and companies who use or own created objects.

Figure 16:
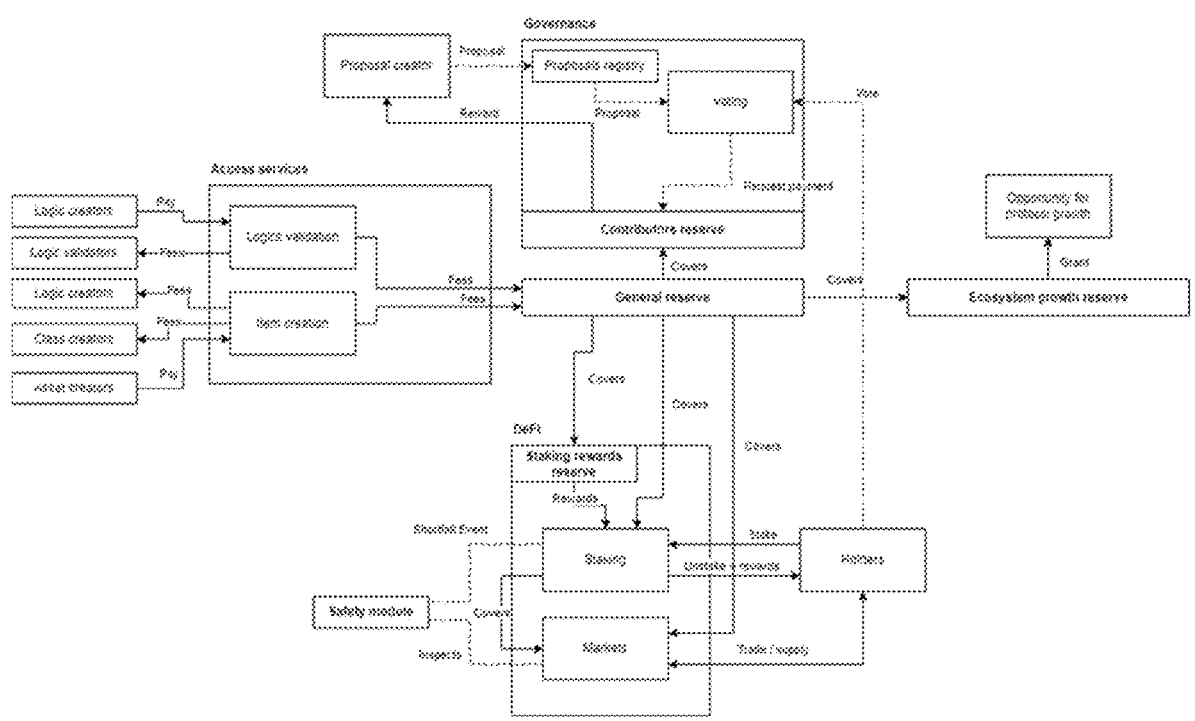
FIG. 16 is a schematic illustration of value and governance flows for economic incentives in accordance with disclosed implementations.

As shown in FIG. 16, an ecosystem may issue a fungible token, using methods that are well understood by blockchain practitioners using the token factory 110 or other methods for issuing fungible tokens on a distributed ledger. The token is used as a fee for the following actions: Logic certification, Object creation, and Object use. The ecosystem may charge a tax on these fees used to fund the general welfare of the ecosystem including protocol development.

When registering smart contract logic in the logic registry, LCs set the price for the use of smart contract logic they have created. Similarly, CCs set the price for use of the classes they have configured. This allows competition to be created where the CCs and LCs are looking to profit from the use of deployed or configured functionality but not set a price that is too high and discourages potential use from ACs.

To certify registered logic, the LC uses the utility token as a payment for certification. This payment is committed to the logic registry 106. LV receives these tokens on completion of the certification task. The price for certification may depend on a number of factors such as the size and complexity of the smart contract code, the price charged for use, or other factors and may be negotiated separately.

When creating an object via the item registry 102, an AC pays fees for the desired class template in class registry 104*a*s assigned by the CC. The class includes registered logic. Both the LC and CC are paid with the utility token based on this transaction when respective functionality is used. If logic or class is presented multiple times in an asset—fees are paid only once.

The ability to command higher fees for more valuable functionality incentivizes CCs and LCs to produce high quality workmanship and provide rewards for time, efforts, and higher gas consumption by contributors. AU will leverage created objects. Behaviors encoded in the objects may include additional fees for use. AU will seek to minimize costs, limiting fees charged by ACs, LCs and CCs from creating unreasonably complex and expensive logic and class functions and also will lead to optimization.

A fungible utility token may also be used for ecosystem governance using decentralized voting methods that are understood by blockchain practitioners. To support governance, authorized users can present Executable or Suggestion proposals for consideration. Proposal execution rewards are funded from the general fund for the ecosystem.

Executable Proposals must be executable code, not a formal suggestion letter or any other type of change proposal. Executable proposals include: Updating protocol contract storage and functionality; Removal of logics, classes, assets from registries; Changing fee structures; Changing ecosystem variables and parameters; and Changing logic certification methods or certifiers.

With an Executable proposal, its creator may request a reward rate in utility tokens for it, otherwise a base proposal rewards rate in utility tokens will be applied. Executable proposals are subject to a time gated voting period, and any utility token owner can vote (1 token=1 vote) for or against its acceptance including requested reward. Different governance and quorum models are possible. But as a baseline, if at least 50% of all current holders have voted affirmative, the proposal becomes accepted. After acceptance, the proposal will be applied to protocol after a Timelock of a specified number of days.

Additionally, Suggestion proposals may be implemented. For example, if some party holds at minimum threshold of utility tokens, they may request the core PD team implement their formal suggestion letter proposal. These types of proposals aren't executable code, but a formal description of what needs to be done. This type of proposal may contain rewards rate in utility tokens for both its acceptance and implementation, otherwise a base proposal rewards rates will be applied. Suggestion proposals are evaluated by governance in the same way as Executable proposals. If it was accepted—its creators receive rewards and the core PD team must implement it in reasonable time.

After implementation the proposal becomes executable and submitted by the core PD team to governance with pre-approved reward. After proposal approval, the core PD team is the beneficiary of rewards. Utility tokens can be staked within smart contracts. It is an indication of a commitment to the protocol and act as its insurance. Staked tokens function like a security deposit, that provides insurance to protocol standards and deters malicious behavior. As a reward, for the benefits of this pool, stakers receive a dividend on their deposit on a periodic basis. Removing one's stake may require a configurable cooldown period.

Utility token holders can participate in markets for any authorized DeFi and CeFi projects, trading utility tokens on exchanges, providing them to liquidity pools, etc. in or outside of the composable ecosystem. Market making activities for the utility token may be supported directly from the General Reserve. A portion of the utility tokens can be used to incentivize ecosystem growth including incentivizing collaborations with other projects, delivery of important or desirable behaviors to the logic registry, creation of important and valuable projects that may accelerate protocol growth, and referral rewards.

To be certified, logic published to the registry should be "self-describing", i.e., declare supported interfaces, properties, functions, events, dependencies, triggers and other data as required for composability. Additionally, logic must support the session model to reject unauthorized requests for controlled (non-public) functions. Additionally, contributed logic to the Logic Registry is reviewed to ensure no external calls, except calls to the D-TCP are made to prevent injection of undesirable or unauthorized behavior outside the scope of the D-TCP.

Figure 17:
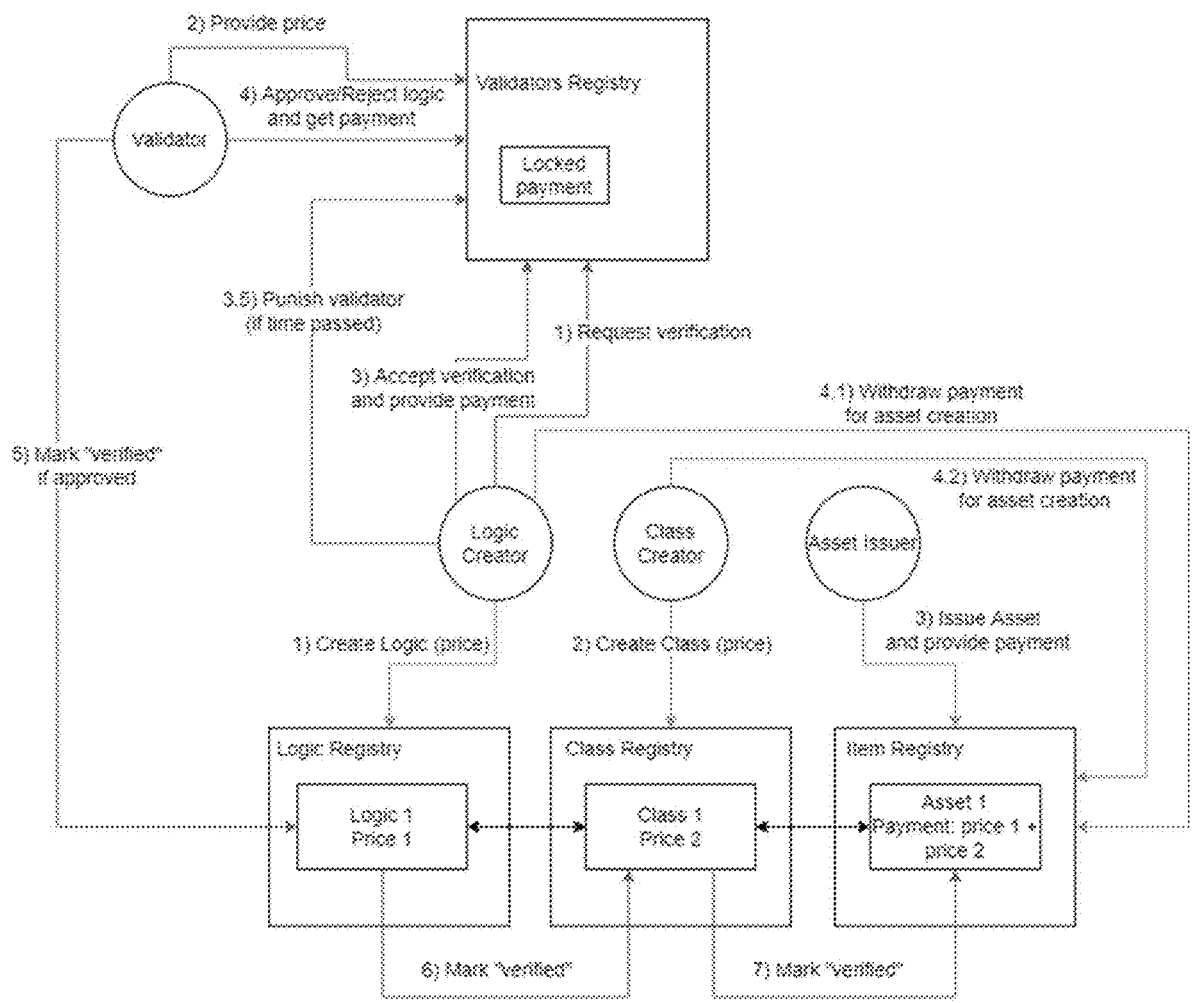
FIG. 17 is a schematic illustration of actions and value exchanges for logic certification and use in accordance with disclosed implementations.

FIG. 17 highlights the verification process. At 1 (red), LCs request certification of registered logic. At 2, LVs provide a price for the certification of the code. At 3, LCs reject or accept the terms and post payment to the Validator's Registry (also shown as CertifierRegistry in FIG. 2c), a smart contract that allows the creation and management of Logic Validators as well as the escrow and distribution of utility tokens associated with the validation process. At 4, LVs may approve or reject reviewed logic receiving payment on judgment. At 5, logic certifications are recorded in the Logic Registry 106. At 6 and 7, logic certification events are published to the Class Registry 104 and Item Registry 102.

One example of an application of the disclosed embodiments is securities lending. In this example, 4 smart contracts are published to a distributed ledger and registered via the logic registry 106. These smart contracts represent independent, composable functions common in many banking settings: fund (pooled capital) functionality, loan functionality, collateral functionality, and loan request/origination logic.

Figure 15A:
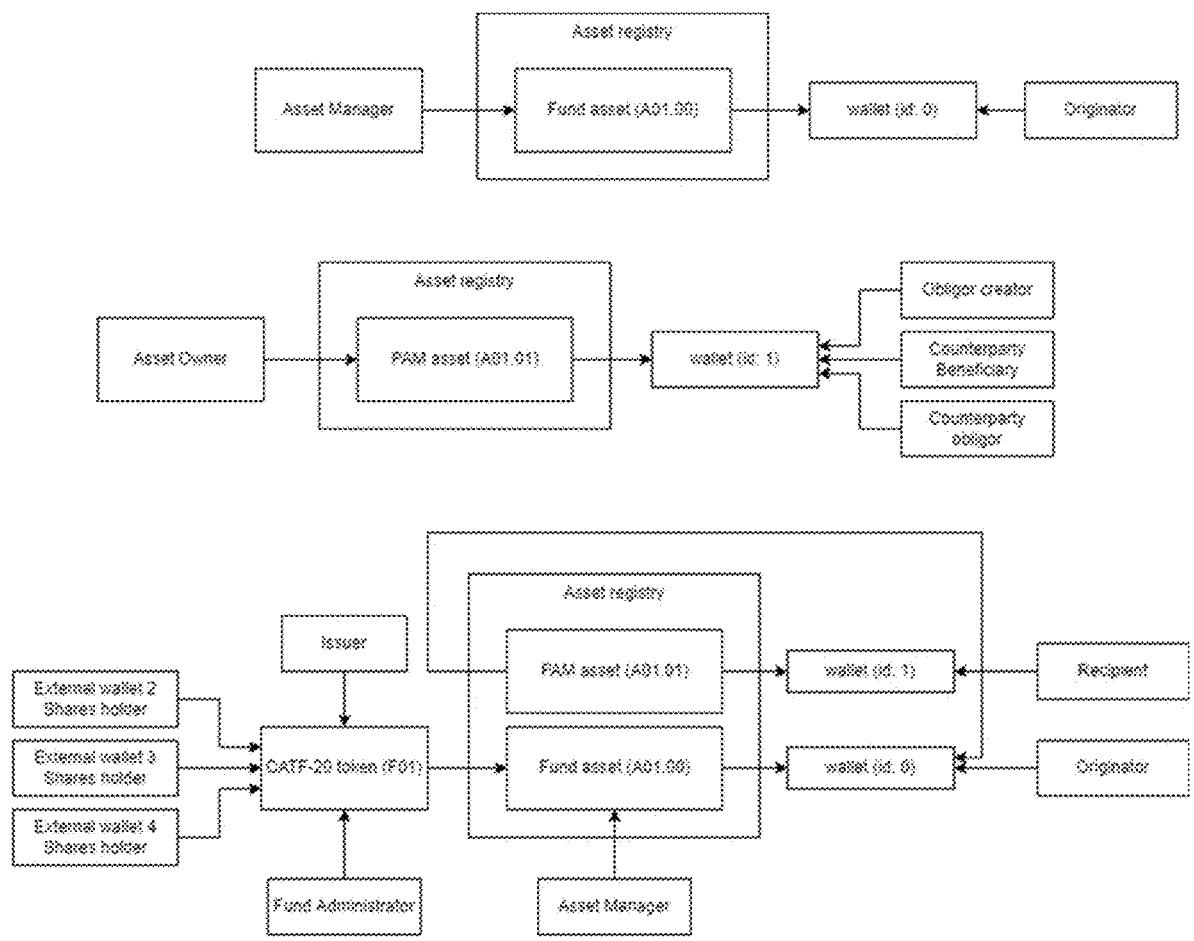
FIG. 15*a* is a schematic illustration of the basic object relationship for an application built using composable objects in accordance with disclosed implementations.

Using class registry 104, the behaviors enabled by the registered logic can be composed into 3 classes that implement an investment bank's securities lending scenario. First, the loan and collateral classes are composed from the interfaces exposed by the loan and collateral smart contracts. Appendix 13 provides an example implementation of a loan class interface used for composition. Appendix 14 provides an example implementation of a fund class interface used for composition. Then, the lending pool class if formed by combining the logic of a fund and loan origination logic where the loan origination logic is plugged in for the funds asset management strategy. An instance of the lending pool is created by creating an object in item registry 102 referencing the lending pool class template. The instantiated lending pool is then attached to a fungible token representing a depository receipt for securities deposited to the fund to support lending operations. The lending pool object has an assigned wallet enabling automation of the treasury functions of the fund. FIG. 15a illustrates a high-level relationship between objects in this example.

Figure 15B:
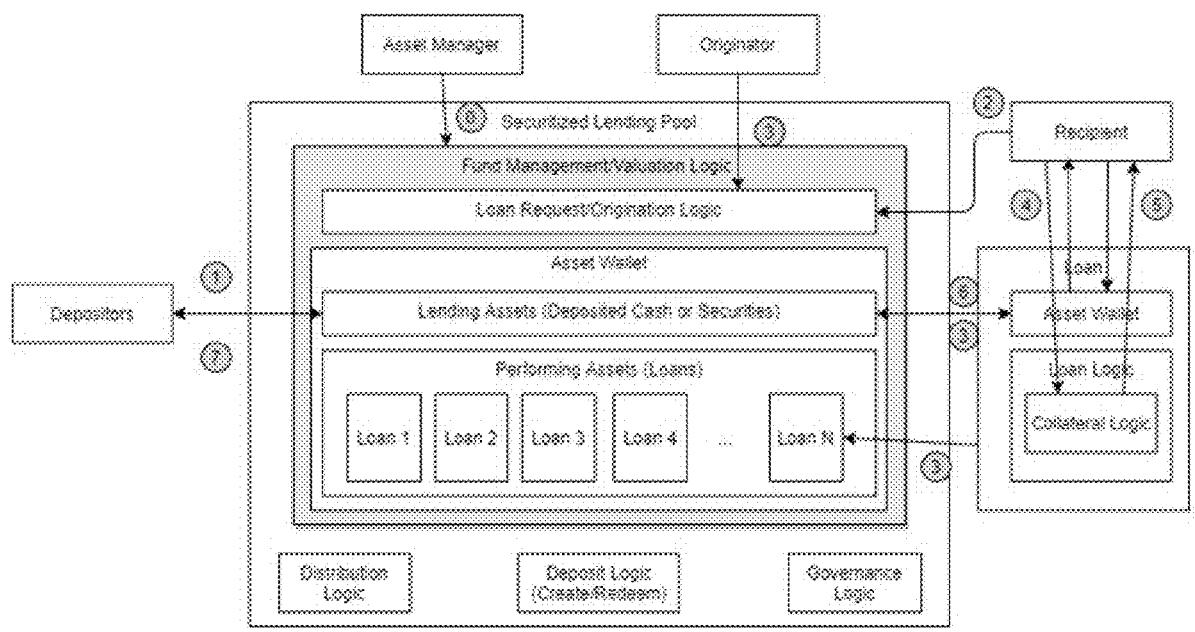
FIG. 15*b* is a schematic illustration of a process for accomplishing and example application in accordance with disclosed implementations.

FIG. 15b is a schematic illustration of a process for accomplishing this example. At 0 an Asset manager, as owner of a wallet which "owns" the asset object sets rules for the securitized fund. The rules can be conventional business rules and the like for governing use of the fund and for actions to be taken by the fund. Once the securities lending object asset, is created in the manner described above based on the rules, depositors deposit assets, at 1, for lending and receive depository receipt (tokens representing shares of a lending pool) in return. At 2, a loan recipient requests a loan. At 3, the loan originator, the identity of which can be assigned by the asset manager, approves (or denies) the loan request. Assuming the loan is approved, a loan asset (NFT) is created and added to balance sheet (the owning wallet) of the fund. The loan asset is assigned a collateral object to facilitate collateral operations. Then, requested shares are transferred from the lending pool's wallet to be escrowed in the loan asset object for distribution on acceptance of the loan. These shares are be returned to the lending pool and the loan canceled if not enacted within a timeframe. At 4, the loan recipient posts required collateral to the loan's collateral object, thereby accepting the loan and releasing corresponding loaned assets to the recipient's wallet. After a time, at step 5, the loan recipient makes a payment against loan. At 6, the loan payment is processed by the loan smart contract which transfers received funds to loan pool. If the loan repaid in its entirety, the collateral is released returning it to the loan recipient. At 7, distributions (interest payments) are made to depositors using the proceeds from the pool's assets.

Figure 15C:
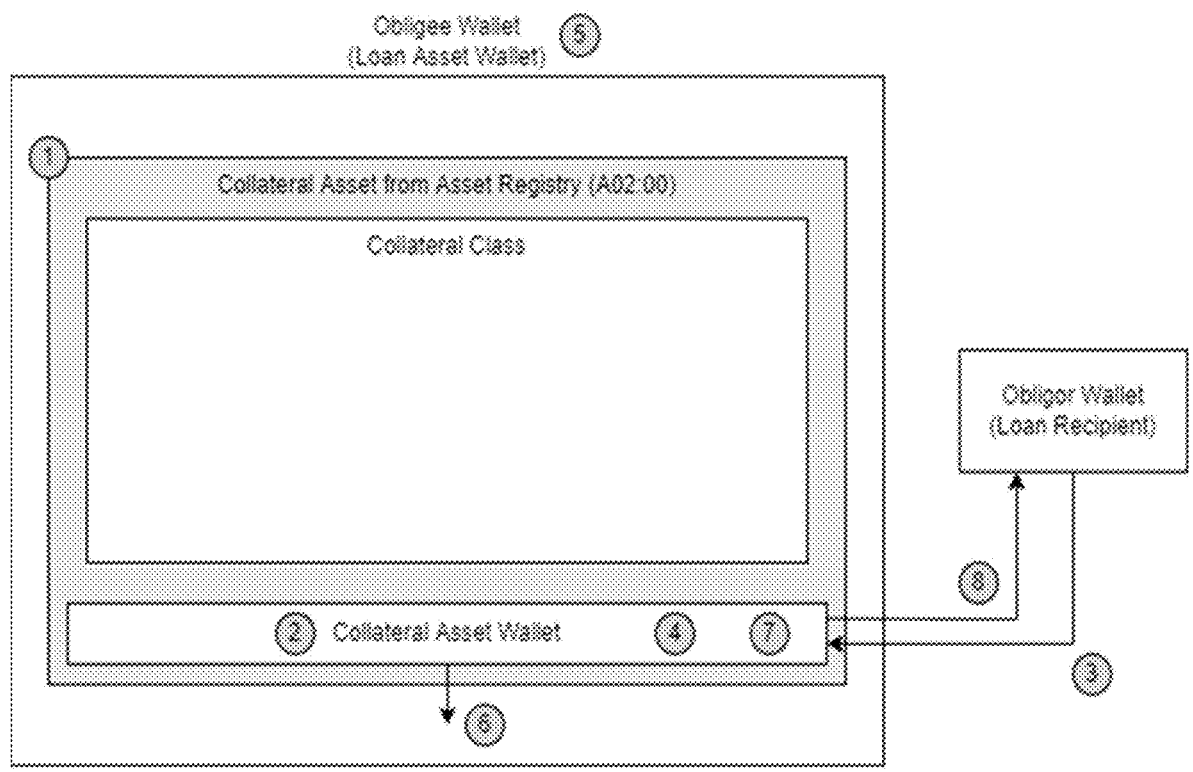
FIG. 15*c* is a schematic illustration of a collateral management application built using composable objects in accordance with disclosed implementations.

A summary of collateral operations used in the Securities lending example or other investment banking flows is shown in FIG. 15*c*. The disclosed configurability allows banking collateral functions to be configured and connected to service many banking operations without coding. As shown in FIG. 15*c*, at 1, Obligee (Lender) creates a Collateral Asset and adds to the Loan Asset's wallet. At 2, The Value of the Collateral Asset (A02:00) is the sum of all obliged assets in its wallet. Obliged assets are assets that have not been Released. A collateral asset publishes its value using the IAsset.Price interface. The value is usually determined based on its market (exchange) value often drawn from an oracle. At 3, Obligor posts collateral by sending to the Wallet of the Collateral Asset A02:00. At 4, Collateral Class throws an event when its wallet receives value. At 5, Obligee performs actions (release loan funds) based on this event if sufficient collateral is posted. At 6, If Default conditions are met (failed repayment or under-collateralization due to price change), the assets can be seized using the ICollateralAsset.Seize interface. This signed transaction results in the transfer of funds from the Collateral Asset Wallet (A02:00) to the Obligee wallet. Partial seizures are possible. At 7, If collateral conditions are met (loan repayment), the Obligee wallet signs a Release transaction using the ICollateralAsset.Release interface. Released assets may remain in the Collateral asset's wallet but are not counted in its valuation. Partial releases (less than the full value of the collateral) are possible. At 8, An Obligor may reclaim released assets by signing a Reclaim transaction using the ICollateralAsset.Reclaim interface which results in a transfer of the released assets to the Obligor wallet.

Figure 18:
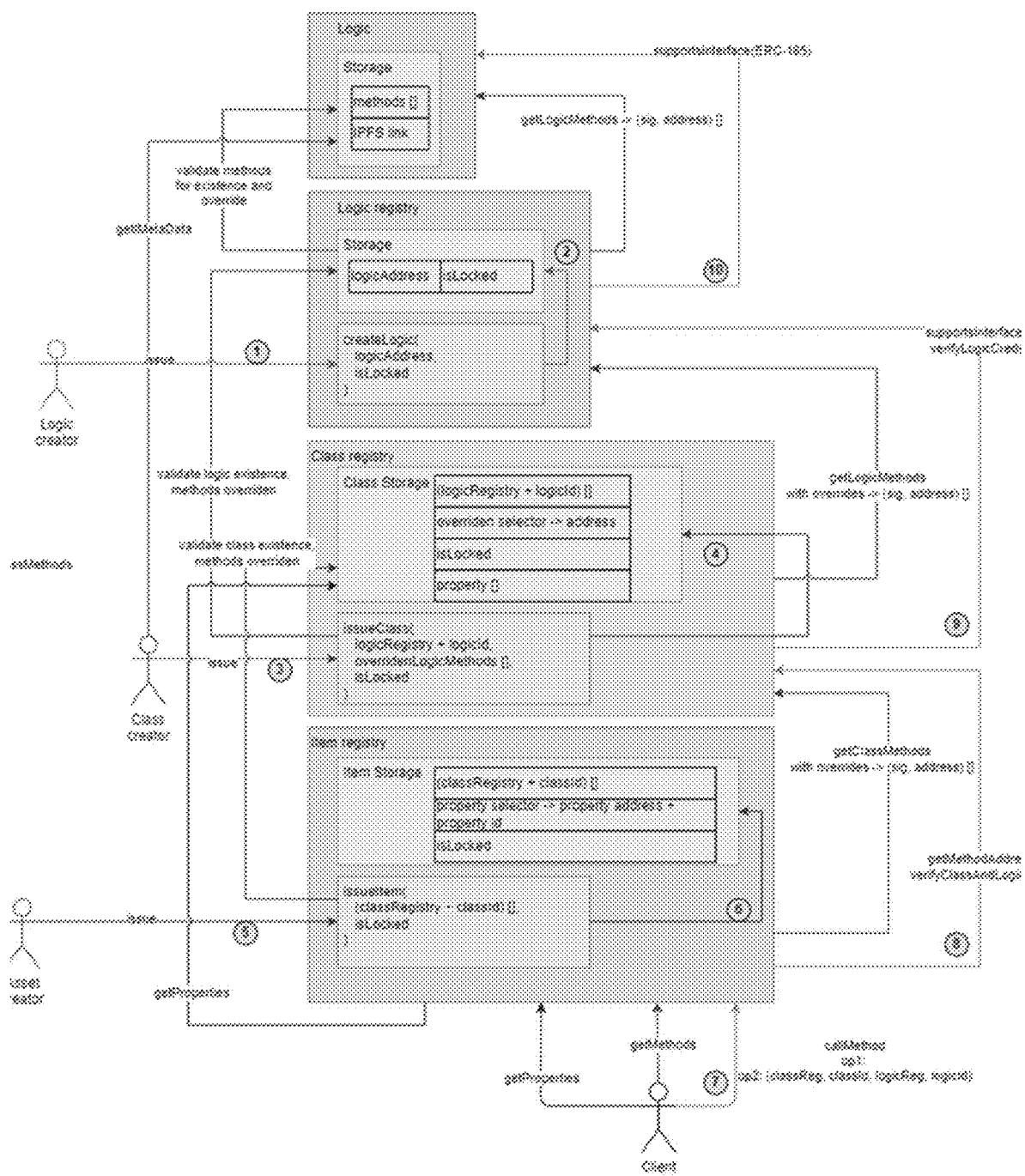
FIG. 18 illustrates a high level summary of interactions between the elements of system.

FIG. 18 illustrates a high level summary of interactions between the elements of system 100. The illustration highlights the basic functions associated with the creation and use of the main registries in the system. To illustrate, the basic steps for creating a composable loan object can be shown in the following sequence. At 1, an authorized user registers a smart contract implementing loan behaviors. At 2, this registration is stored in the logic registry 106. At 3, an authorized user creates a class template referencing the registered logic enabling the routing of requests from objects implementing the class template to the designated logic for execution. At 4, the class template is stored in the class registry 104. At 5, an authorized user, perhaps the lender, issues a new item assigning the loan class to the object. At 6, the item is stored in the item registry 102. At 7, an authorized user, perhaps the loan recipient, publishes a request (ex GetLoanBalance). At 8, the item registry 102 determines the authorization for the request. If authorized, the item registry 102 makes a request to the class registry to find the path to the logic to execute the request. At 9, the class registry 104 makes a request to the logic registry to verify the existence of the function within the logic. At 10, the logic registry 106 make a request to the registered logic to obtain the routing information for the requested function. If verified, the signature is cached at the item registry to accelerate future requests, a session is initiated, and the request is routed to the registered smart contract for execution. Many of the specific interactions were covered in detail in descriptions of each element. The illustration provides a non-exhaustive summary of these interactions for reference. The specific nature of all interactions can be ascertained from the disclosure above.

Interesting applications exist for composable objects exist in other domains as well. Recently, considerable interest has arisen for the application of blockchain technologies to gaming and the metaverse, a virtual-reality space in which users can interact with a computer-generated environment and other users. Substitute the loan class in the example above for a starship class, with configurable properties (payload, fuel consumption, defensive characteristics, range, location, velocity, etc), and functions (attack, dock, etc) that enable an object assigned to the class interact with other objects. The starship class can be assigned weapons, an instance of the laser gun class for example. The starship may have a docking bay object in which other instances of a smaller class of ships can land. The ability to quickly create and assign behaviors enabled by registered smart contracts to create classes of objects that can interact with other objects of the same or different classes provides a powerful substrate for game development and creation in the metaverse.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A method for creating and managing configurable objects, the objects being executable on a decentralized computing network to affect asset behaviors, the method comprising:
   specifying, using a creator wallet, a class, required object properties, wherein the class is defined by a class template expressed as a data structure specifying executable behaviors for the class, the behaviors including permissions, interfaces, functions, properties, events, errors, and dependencies assigned to the class, the class template being stored in a class template registry in the decentralized computing network, wherein the creator wallet includes an address on the decentralized computing network;
   instantiating a configurable object in the item registry, the object having a unique identifier, and a pointer to a class template that is configured to enable desired behaviors of the object;
   routing, by a trusted control plane, requests from authorized users of the configurable object to affect object behaviors, the trusted control plane a smart contract proxy that ensures the security and authenticity of routed requests, the routing using instructions in the data structure of the class template assigned to the object, the data structure including a map to registered smart contract logic that executes the object behaviors, the logic registered in a logic registry, the logic being in the form of smart contract code that is executable in the decentralized computing network; and
   executing, via registered smart contract logic the desired object behaviors on a distributed ledger network.

2. The method of claim 1, wherein logic in the logic registry is published by authorized publishers as predefined distributed ledger smart contracts having declared interfaces, each of the predefined distributed ledger smart contracts implementing functions including a required function that returns a description of implemented interfaces and functions, properties, events, triggers, and dependencies in a standardized manner to thereby enable third party combination and configuration, and wherein each of the predefined distributed ledger smart contracts implement a defined session management pattern to ensure only authorized requests are processed by the smart contract, the logic registry containing a list of all smart contracts made available to the system including an identifier for the developer publishing each smart contract.

3. The method of claim 2, wherein the distributed ledger smart contracts are validated by an authorized party as meeting the declared interfaces and implementing proper security controls via a specification to identify certifiers, negotiate payment, and record and publish code review.

4. The method of claim 1, wherein the class templates are configured by authorized class designers, each class template containing a mapping to authorization models, properties, and code stored in the logic registry and executed via the trusted control plane, the class templates containing desired behaviors and requisite authorization models, the class template representing behaviors of a collection of virtual or physical items, the behaviors comprising interfaces and functions, properties, events, triggers, identifier types, dependencies, and rights to interact with the virtual or physical object.

5. The method of claim 4, wherein a child class template may inherit behaviors from a parent class template, the inheritance affected by routing desired behaviors for execution using the parent template unless the child class explicitly overrides or extends the parent routing instructions with defined behaviors, and if overridden or extended, routing for execution based on the child template instructions.

6. The method of claim 4, wherein an object may upgrade its behavior by assigning a new class template to its item registry record, the new class template upgraded from an earlier version of the class template by copying the old class template and changing or extending by assigning new behaviors, the behaviors affected by routing requests for execution based on the new class template.

7. The method of claim 1, wherein objects may be assigned one or more external identifiers, the external identifiers facilitating reconciliation with or between external systems, the assignment linking the object item Id, the identifier type, and the external identifier.

8. The method of claim 1, wherein the object is assigned a smart contract wallet, the wallet being a unique address on a distributed ledger that can be used to send or receive value and make state changes requests to other objects, the wallet operated by smart contract logic assigned to the object via its class template.

9. The method of claim 1, wherein the instantiating of the object assigns behaviors for transferability of the object ownership between distributed ledger wallets, the behaviors characteristic of a non-fungible token (NFT).

10. The method of claim 9, wherein the object record specifies an owner wallet associated with the object.

11. The method of claim 1, wherein the configurable object may be assigned properties by any authorized user, the properties not necessarily linked to the designated class template.

12. The method of claim 1, wherein the step of instantiating a configurable object in accordance with the executable logic for the class and the object properties includes recording each object in the item registry in association with a unique identifier and an assigned class by initiating an assign request, each object instance exhibiting the behaviors, interface, functions, properties, events, triggers, identifier types, and dependencies of the assigned class, and object specific values assigned to class properties.

13. The method of claim 12, further comprising execution of object functions by ecosystem participants via signed state change requests routed through the item registry, wherein the item registry determines the eligibility of the state change requests based on the control context assigned to the desired request and the attributes and roles of the requestor with respect to the object, executing the validated state change requests on the decentralized network.

14. The method of claim 13, further comprising the item registry creating a session to manage the execution of the desired request, a proxy routing the state change request to the appropriate code based on the class template, the code validating the legitimacy of the request based on the presence of a session and the code.

15. The method of claim 1, further comprising rewarding parties contributing logic, certifications, or class templates to the decentralized computing network through the use of a utility token, the utility token being a unit of value linked to the utility of the ecosystem.

16. The method of claim 9, wherein the instantiated object may be attached to one or more share classes, the share classes being fungible tokens permitting fractional ownership of the non-fungible asset, the linkage between the non-fungible token and associated fungible tokens enacted through a two way agreement transferring control of the fungible token issuing authority in exchange for rights to affect behaviors in the non-fungible token.

17. The method of claim 1, wherein the routing comprises:
receiving a request that includes a function identifier, an item wallet, and request data;
identifying based on the item wallet the object to which the request applies;
requesting, by a smart contract of an item registry, a pointer to the function from a class registry based on a class template assigned to the classId associated with the object; determining a path to the requested function corresponding to the function identifier based on the routing instructions in the data structure of the class template; verifying the function is implemented by the smart contract address identified by the class template; and executing the request via the designated smart contract logic.

18. The method of claim 1, wherein the executing of configurable logic enables the behaviors of a bank lending operation.

19. A computer system for creating and managing configurable objects, the objects being executable on a decentralized computing network to affect asset behaviors, the system comprising:
at least one computer processor; and
at least on memory device storing instructions that, when executed by the at least one computer processor, cause the at least one computer processor to carry out a method comprising:
specifying, using a creator wallet, a class, required object properties, wherein the class is defined by a class template expressed as a data structure specifying executable behaviors for the class, the behaviors including permissions, interfaces, functions, properties, events, errors, and dependencies assigned to the class, the class template being stored in a class template registry in the decentralized computing network, wherein the creator wallet includes an address on the decentralized computing network;

instantiating a configurable object in the item registry, the object having a unique identifier, and a pointer to a class template that is configured to enable desired behaviors of the object;

routing, by a trusted control plane, requests from authorized users of the configurable object to affect object behaviors, the trusted control plane a smart contract proxy that ensures the security and authenticity of routed requests, the routing using instructions in the data structure of the class template assigned to the object, the data structure including a map to registered smart contract logic that executes the object behaviors, the logic registered in a logic registry, the logic being in the form of smart contract code that is executable in the decentralized computing network; and executing, via registered smart contract logic the desired object behaviors on a distributed ledger network.

20. The system of claim 19, wherein logic in the logic registry is published by authorized publishers as predefined distributed ledger smart contracts having declared interfaces, each of the predefined distributed ledger smart contracts implementing functions including a required function that returns a description of implemented interfaces and functions, properties, events, triggers, and dependencies in a standardized manner to thereby enable third party combination and configuration, and wherein each of the predefined distributed ledger smart contracts implement a defined session management pattern to ensure only authorized requests are processed by the smart contract, the logic registry containing a list of all smart contracts made available to the system including an identifier for the developer publishing each smart contract.

21. The system of claim 20, wherein the distributed ledger smart contracts are validated by an authorized party as meeting the declared interfaces and implementing proper security controls via a specification to identify certifiers, negotiate payment, and record and publish code review.

22. The system of claim 19, wherein objects may be assigned one or more external identifiers, the external identifiers facilitating reconciliation with or between external systems, the assignment linking the object item Id, the identifier type, and the external identifier.

23. The system of claim 19 wherein the object is assigned a smart contract wallet, the wallet being a unique address on a distributed ledger that can be used to send or receive value and make state changes requests to other objects, the wallet operated by smart contract logic assigned to the object via its class template.

24. The system of claim 19, wherein the instantiating of the object assigns behaviors for transferability of the object ownership between distributed ledger wallets, the behaviors characteristic of a non-fungible token (NFT).

25. The method of claim 24, wherein the object record specifies an owner wallet associated with the object.

26. The system of claim 24, wherein the instantiated object may be attached to one or more share classes, the share classes being fungible tokens permitting fractional ownership of the non-fungible asset, the linkage between the non-fungible token and associated fungible tokens enacted through a two way agreement transferring control of the fungible token issuing authority in exchange for rights to affect behaviors in the non-fungible token.

27. The system of claim 19, wherein the configurable object may be assigned properties by any authorized user, the properties not necessarily linked to the designated class template.

28. The system of claim 27, wherein the class templates are configured by authorized class designers, each class template containing a mapping to authorization models, properties, and code stored in the logic registry and executed via the trusted control plane, the class templates containing desired behaviors and requisite authorization models, the class template representing behaviors of a collection of virtual or physical items, the behaviors comprising interfaces and functions, properties, events, triggers, identifier types, dependencies, and rights to interact with the virtual or physical object.

29. The system of claim 28, wherein a child class template may inherit behaviors from a parent class template, the inheritance affected by routing desired behaviors for execution using the parent template unless the child class explicitly overrides or extends the parent routing instructions with defined behaviors, and if overridden or extended, routing for execution based on the child template instructions.

30. The system of claim 28, wherein an object may upgrade its behavior by assigning a new class template to its item registry record, the new class template upgraded from an earlier version of the class template by copying the old class template and changing or extending by assigning new behaviors, the behaviors affected by routing requests for execution based on the new class template.

31. The system of claim 19, wherein the step of instantiating a configurable object in accordance with the executable logic for the class and the object properties includes recording each object in the item registry in association with a unique identifier and an assigned class by initiating an assign request, each object instance exhibiting the behaviors, interface, functions, properties, events, triggers, identifier types, and dependencies of the assigned class, and object specific values assigned to class properties.

32. The system of claim 31, further comprising execution of object functions by ecosystem participants via signed state change requests routed through the item registry, wherein the item registry determines the eligibility of the state change requests based on the control context assigned to the desired request and the attributes and roles of the requestor with respect to the object, executing the validated state change requests on the decentralized network.

33. The system of claim 32, further comprising the item registry creating a session to manage the execution of the desired request, a proxy routing the state change request to the appropriate code based on the class template, the code validating the legitimacy of the request based on the presence of a session and the code.

34. The system of claim 19, further comprising rewarding parties contributing logic, certifications, or class templates to the decentralized computing network through the use of a utility token, the utility token being a unit of value linked to the utility of the ecosystem.

35. The system of claim 19 wherein the routing comprises:

receiving a request that includes a function identifier, an item wallet, and request data;

identifying based on the item wallet the object to which the request applies;

requesting, by a smart contract of an item registry, a pointer to the function from a class registry based on a class template assigned to the classId associated with the object; determining a path to the requested function corresponding to the function identifier based on the routing instructions in the data structure of the class template; verifying the function is implemented by the smart contract address identified by the class template; and executing the request via the designated smart contract logic.

36. The method of claim 19, wherein the executing of configurable logic enables the behaviors of a bank lending operation.

* * * * *